US012054377B2

(12) United States Patent
Yamamoto et al.

(10) Patent No.: US 12,054,377 B2
(45) Date of Patent: Aug. 6, 2024

(54) SHEET STACKING APPARATUS, CONTROL METHOD OF SAME, AND SHEET CONVEYING SYSTEM

(71) Applicant: Horizon Inc., Takashima (JP)

(72) Inventors: Hiroki Yamamoto, Takashima (JP); Kohei Kashiwagi, Takashima (JP)

(73) Assignee: Horizon Inc., Shiga (JP)

( * ) Notice: Subject to any disclaimer, the term of this patent is extended or adjusted under 35 U.S.C. 154(b) by 133 days.

(21) Appl. No.: 17/509,685

(22) Filed: Oct. 25, 2021

(65) Prior Publication Data

US 2022/0127120 A1 Apr. 28, 2022

(30) Foreign Application Priority Data

Oct. 26, 2020 (JP) ................................ 2020-179033

(51) Int. Cl.
*B65H 7/20* (2006.01)
*B65H 1/04* (2006.01)
(Continued)

(52) U.S. Cl.
CPC ................ *B66F 9/12* (2013.01); *B65H 1/04* (2013.01); *B65H 7/20* (2013.01); *B65H 31/02* (2013.01);
(Continued)

(58) Field of Classification Search
CPC ... B66F 9/12; B66F 9/063; B65H 1/04; B65H 7/20; B65H 31/02; B65H 2511/214; B65H 2511/415
See application file for complete search history.

(56) References Cited

U.S. PATENT DOCUMENTS

| | | | | |
|---|---|---|---|---|
| 4,765,790 A | 8/1988 | Besemann | | |
| 5,386,981 A * | 2/1995 | Sugimoto | .............. | B41F 13/54 271/189 |

(Continued)

FOREIGN PATENT DOCUMENTS

| | | | | |
|---|---|---|---|---|
| DE | 102014205674 * | 1/2006 | .............. | B65H 7/20 |
| DE | 102014205674 A1 | 10/2015 | | |

(Continued)

OTHER PUBLICATIONS

European Search Report dated Apr. 4, 2022 in corresponding application 21203647.9.

(Continued)

*Primary Examiner* — Lynn E Schwenning

(74) *Attorney, Agent, or Firm* — Muncy, Geissler, Olds & Lowe, P.C.

(57) ABSTRACT

Provided is a stacker including a stacking shelf on which printed paper from a printer is received and stacked, a lifting and lowering mechanism that lifts and lowers the stacking shelf, and a stacker control unit that controls the lifting and lowering mechanism. The stacker control unit controls the lifting and lowering mechanism to lift and lower the stacking shelf to a first predetermined height corresponding to the printer at a receiving position for receiving the paper from the printer, and to lift and lower the stacking shelf to a second predetermined height corresponding to a sheet processing machine at a paper supply position for supplying paper to the sheet processing machine, the paper supply position being different from the receiving position.

8 Claims, 21 Drawing Sheets

(51) Int. Cl.
*B65H 31/02* (2006.01)
*B66F 9/06* (2006.01)
*B66F 9/12* (2006.01)

(52) U.S. Cl.
CPC ........ *B66F 9/063* (2013.01); *B65H 2511/214* (2013.01); *B65H 2511/415* (2013.01)

(56) References Cited

U.S. PATENT DOCUMENTS

| | | | | |
|---|---|---|---|---|
| 5,842,327 | A * | 12/1998 | Schwede | B65B 27/086 53/589 |
| 9,707,879 | B2 * | 7/2017 | Mecklinger | B66F 9/063 |
| 10,384,870 | B2 * | 8/2019 | Geiger | B65G 1/1375 |
| 10,597,273 | B2 * | 3/2020 | Sokuza | B66F 9/22 |
| 2007/0288123 | A1 * | 12/2007 | D'Andrea | G05D 1/021 700/214 |
| 2010/0091323 | A1 | 4/2010 | Sunada et al. | |
| 2010/0139511 | A1 | 6/2010 | Schaede | |
| 2013/0166108 | A1 * | 6/2013 | Sturm | B66F 9/063 701/2 |
| 2020/0031639 | A1 * | 1/2020 | Rauwolf | B66F 9/22 |
| 2020/0255249 | A1 | 8/2020 | Michel | |

FOREIGN PATENT DOCUMENTS

| | | | |
|---|---|---|---|
| EP | 3636567 | A1 | 4/2020 |
| JP | S62269846 | A | 11/1987 |
| JP | H0592552 | A | 4/1993 |
| JP | 2006321583 | A | 11/2006 |
| JP | 2010089849 | A | 4/2010 |
| JP | 2013-052971 | A | 3/2013 |
| JP | 2014-088032 | A | 5/2014 |
| JP | 2017200848 | A | 11/2017 |
| JP | 2019-048715 | A | 3/2019 |
| JP | 2020050475 | A | 4/2020 |

OTHER PUBLICATIONS

European Search Report dated Apr. 4, 2022 in corresponding application 21203642.0.

Japanese Office Action dated May 9, 2024 in corresponding application 2020-179033.

* cited by examiner

SHEET STACKING APPARATUS, CONTROL METHOD OF SAME, AND SHEET CONVEYING SYSTEM

CROSS-REFERENCE TO RELATED APPLICATIONS

This application claims priority to Japanese Patent Application No. 2020-179033 filed Oct. 26, 2020, the contents of which are incorporated herein by reference in its entirety.

BACKGROUND

1. Technical Field

The present disclosure relates to a sheet stacking apparatus that stacks sheets such as paper, a control method of the apparatus, and a sheet conveying system.

2. Description of Related Art

Japanese Unexamined Patent Application, Publication No. 2013-52971 discloses a sheet stacking apparatus that stacks paper ejected from a printer on a stacking tray, and conveys the paper to an offline bookbinding machine.

In the sheet stacking apparatus of Japanese Unexamined Patent Application, Publication No. 2013-52971, the stacking tray is lowered depending on a sheet weight, to hold an upper surface of the stacking tray at a fixed position, thereby decreasing burdens on a worker during transshipment work to a paper supply unit.

BRIEF SUMMARY

In the sheet stacking apparatus described in Japanese Unexamined Patent Application, Publication No. 2013-52971, however, it is presumed that transshipment from a cart to a paper supply unit is work performed by a worker, and personnel saving in the paper supply unit is not assumed.

The present inventors have earnestly studied the personnel saving in a process of receiving a sheet ejected from a printer, conveying the sheet to a sheet processing machine, and supplying the sheet into the sheet processing machine. Then, the present inventors have found that the personnel saving is hindered in a case where the printer or the sheet processing machine varies in type depending on a maker, a use application or the like.

The present disclosure has been made in view of such situation, and an object thereof is to provide a sheet stacking apparatus in which personnel saving can be achieved in a process from a printer to a sheet processing machine even with any combination of a plurality of different types of printers with a plurality of different types of sheet processing machines, a control method of the apparatus, and a sheet conveying system.

A sheet stacking apparatus according to an aspect of the present disclosure includes a shelf unit in which a printed sheet from a printer is received and stacked, a lifting and lowering mechanism that lifts and lowers the shelf unit, and a control unit that controls the lifting and lowering mechanism, the control unit controlling the lifting and lowering mechanism to lift and lower the shelf unit to a first predetermined height corresponding to the printer at a receiving position for receiving the sheet from the printer, and to lift and lower the shelf unit to a second predetermined height corresponding to a sheet processing machine at a supply position for supplying the sheet to the sheet processing machine, the supply position being different from the receiving position.

The shelf unit is lifted and lowered to the first predetermined height corresponding to the printer at the receiving position, and the shelf unit is lifted and lowered to the second predetermined height corresponding to the sheet processing machine at the supply position. Consequently, a manual transshipment work can be omitted and automated. Then, personnel saving can be achieved in a process from the printer to the sheet processing machine even with any combination of a plurality of different types of printers with a plurality of different types of sheet processing machines.

In the sheet stacking apparatus according to the aspect of the present disclosure, the first predetermined height corresponding to the printer is a set value individually set for each printer, and/or the second predetermined height corresponding to the sheet processing machine is a set value individually set for each sheet processing machine.

Since the predetermined height is individually set for each printer and/or each sheet processing machine, the shelf unit can be lifted and lowered to an appropriate predetermined height even for different types of printers or sheet processing machines.

The sheet stacking apparatus according to an aspect of the present disclosure includes a communication unit that communicates with a superordinate control unit that is superordinate to the control unit, and the communication unit acquires the set value from the superordinate control unit.

Since the sheet stacking apparatus includes the communication unit that acquires the set value from the superordinate control unit, the apparatus is flexibly compatible with different types of printers or sheet processing machines.

The sheet stacking apparatus according to an aspect of the present disclosure includes unique identification information.

Since the sheet stacking apparatus includes the unique identification information, the apparatus can be distinguished from another sheet stacking apparatus. Consequently, a sheet conveying system in which a plurality of sheet stacking apparatuses are used can be achieved.

The sheet stacking apparatus according to an aspect of the present disclosure includes a tilting mechanism that tilts the shelf unit with respect to a horizontal plane, and an abutment member that abuts on an end portion of the sheet stacked in the shelf unit, and the control unit controls the tilting mechanism to tilt the shelf unit so that an end portion side of the sheet that is not provided with the abutment member is above the other end portion during running from the receiving position to the supply position.

Since the end portion side of the sheet that is not provided with the abutment member is tilted to be disposed above the other end portion during the running, it is possible to avoid concern that the sheet stacked in the shelf unit scatters and falls during the running.

A tilt angle may be changed depending on a sheet stacking amount or acceleration (including deceleration that is negative acceleration) during running. For example, the tilt angle when the stacking amount is small may be larger than the tilt angle when the stacking amount is large.

The sheet stacking apparatus according to an aspect of the present disclosure includes a power receiving device that receives power at the receiving position and/or the supply position, and a battery that stores the power supplied from the power receiving device.

The sheet stacking apparatus stops and performs work at the receiving position and the supply position. At this time, the power receiving device receives power from outside to charge the battery. Consequently, the charging can be performed at an appropriate timing.

The battery supplies power to the control unit, various motors and the like arranged in the sheet stacking apparatus.

The sheet stacking apparatus according to an aspect of the present disclosure includes a caster that runs on a floor.

Since the caster that runs on the floor is provided, the sheet stacking apparatus can be manually moved.

A control method of a sheet stacking apparatus according to an aspect of the present disclosure is the control method of the sheet stacking apparatus including a shelf unit in which a printed sheet from a printer is received and stacked, a lifting and lowering mechanism that lifts and lowers the shelf unit, and a control unit that controls the lifting and lowering mechanism, the method including controlling the lifting and lowering mechanism to lift and lower the shelf unit to a first predetermined height corresponding to the printer at a receiving position for receiving the sheet from the printer, and to lift and lower the shelf unit to a second predetermined height corresponding to a sheet processing machine at a supply position for supplying the sheet to the sheet processing machine, the supply position being different from the receiving position.

A sheet conveying system according to an aspect of the present disclosure includes the sheet stacking apparatus according to any one of the aspects, a printer that ejects a sheet to the sheet stacking apparatus at the receiving position, and a sheet processing machine to which the sheet is supplied from the sheet stacking apparatus at the supply position.

The sheet conveying system according to an aspect of the present disclosure includes an automatic guided vehicle that conveys the sheet stacking apparatus from the receiving position to the supply position.

Personnel saving of a process from the printer to the sheet processing machine can be achieved.

DETAILED DESCRIPTION

Hereinafter, description will be made as to a sheet stacking apparatus according to an embodiment of the present disclosure, a control method of the apparatus and an embodiment of a sheet conveying system with reference to the drawings.

Figure 1:
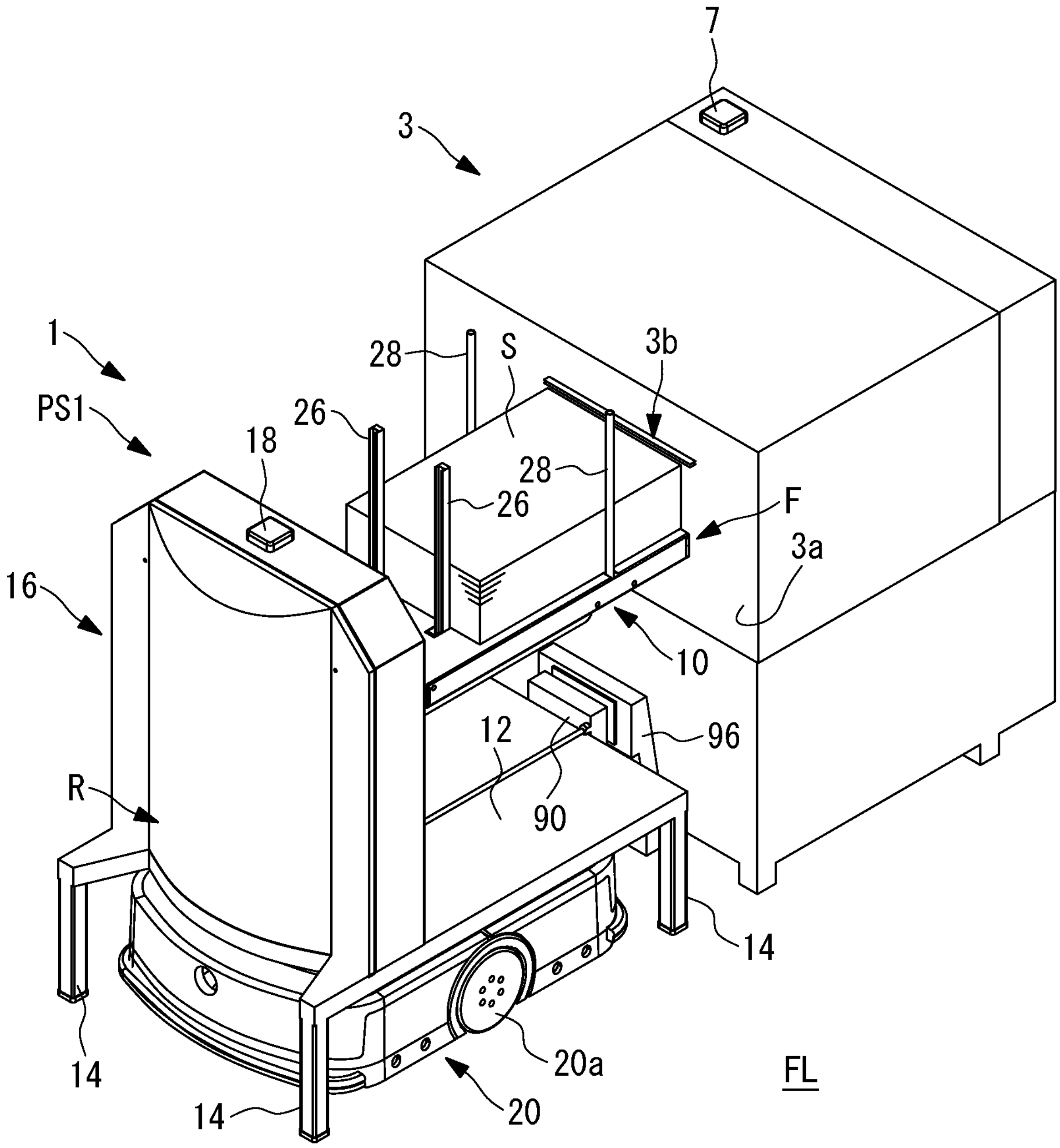
FIG. 1 is a perspective view showing a state where a stacker according to an embodiment of the present disclosure is disposed at a receiving position to a printer.

FIG. 1 shows a state where a stacker (sheet stacking apparatus) 1 included in a printing system 200 (see FIG. 10) according to the present embodiment is disposed at a receiving position PS1 for receiving paper (sheet) S from a printer 3.

Figure 2:
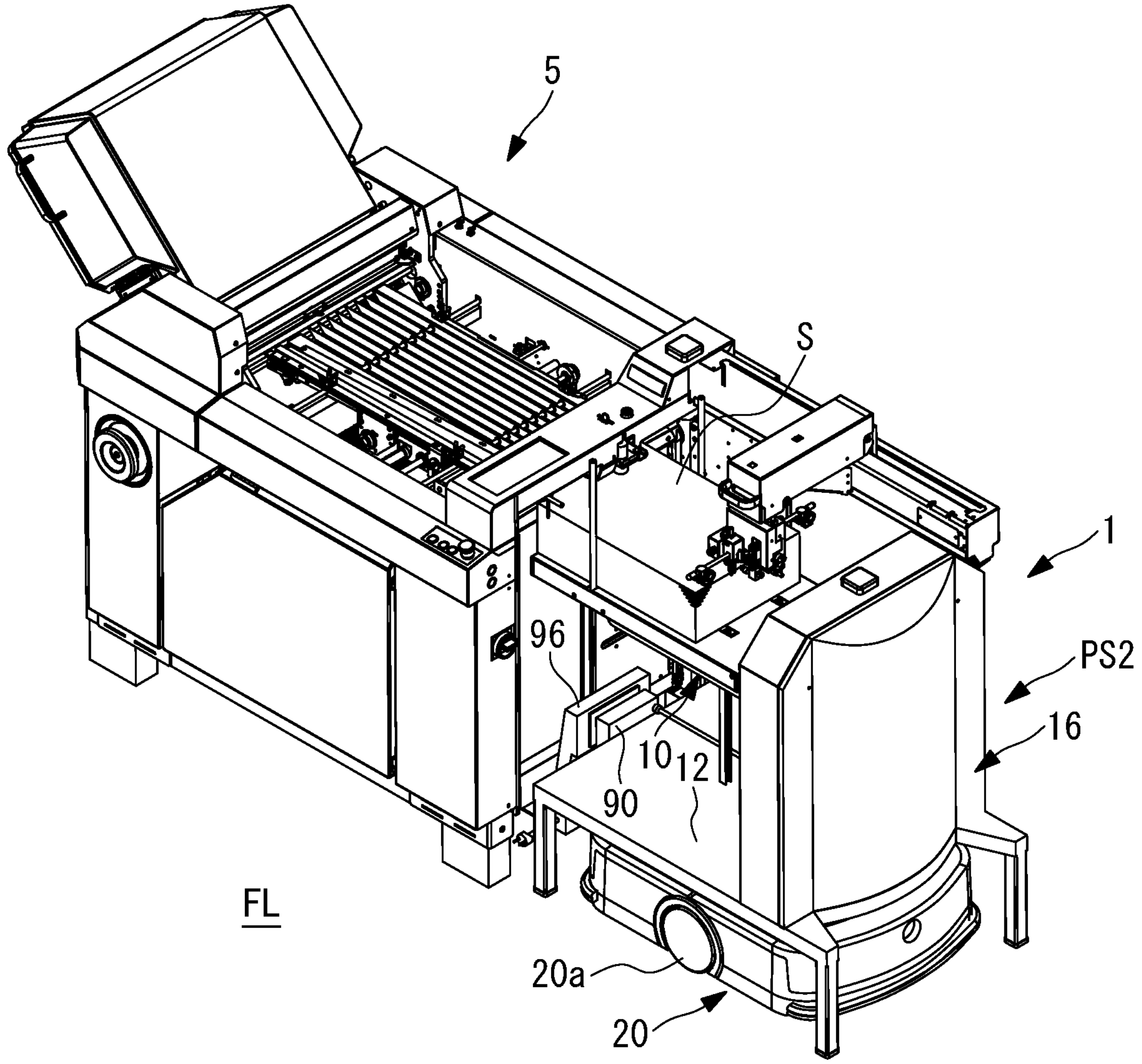
FIG. 2 is a perspective view showing a state where the stacker is disposed at a paper supply position to a paper folding machine.

In the stacker 1, a predetermined number of sheets of paper S printed in the printer 3 are stacked, and then moved to a paper supply position (supply position) PS2 for supplying paper to such a paper folding machine (processing machine) 5 as shown in FIG. 2.

The printer 3 is, for example, a digital printer as shown in FIG. 1, and receives, in a communication unit 7, job information from a printer management device 204 (see FIG. 10), to perform printing of the paper S based on the job information. Note that the job information will be described later in detail.

In a back surface 3*a* of the printer 3, a paper ejection port 3*b* through which the printed paper (sheet) S is ejected out from the printer 3 is formed. The printer 3 performs the printing of the paper S, and ejects the paper S from the paper ejection port 3*b* toward a shelf unit 10 of the stacker 1. Also, the printer 3 counts printed paper, and transmits a count number to the printer management device 204. Further, in a case where the count number reaches the number of sheets to be printed that is included in the job information, a job completion signal and the job ID that is job identification information are transmitted to the printer management device 204.

Figure 3:
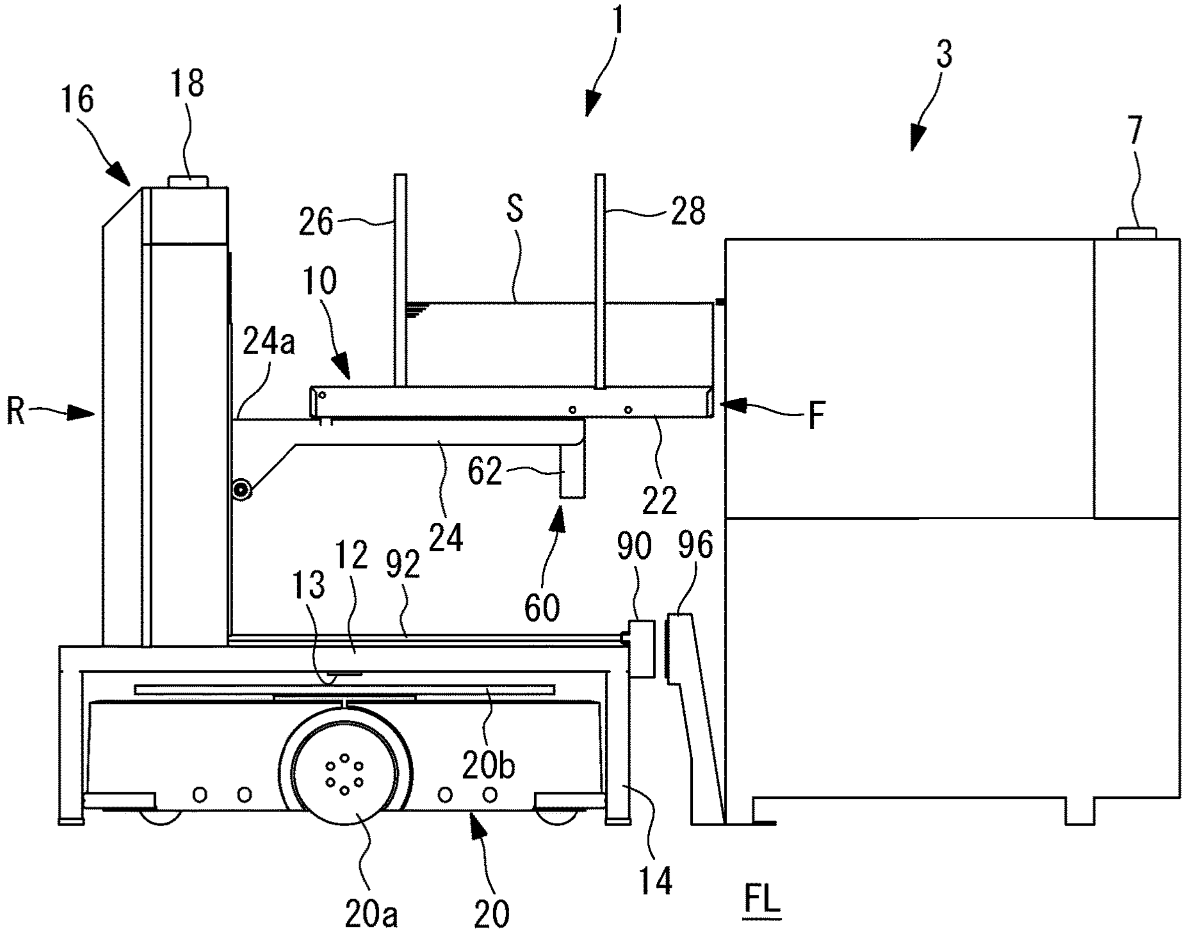
FIG. 3 is a side view showing the stacker and printer of FIG. 1.

As shown in FIG. 3, the stacker 1 has a rectangular shape in planar view and includes a base 12. Leg parts 14 are fixed to four corners of the base 12, respectively. Each leg part 14 is vertically disposed on a floor FL, to support a weight of the stacker 1. A dimension of each leg part 14 in an up-down direction is a length to such an extent that an automatic guided vehicle 20 of a low floor type can be stored under the base 12. The automatic guided vehicle 20 lifts the base 12 from below, to convey the stacker 1. Therefore, the stacker 1 does not include a running device that runs by itself. The automatic guided vehicle 20 includes a wheel 20*a*, and runs along a predetermined route in accordance with an instruction from an after-mentioned conveyance management device 203 (see FIG. 10).

Stacker ID (identification information) 13 is fixed to a lower surface of the base 12. In the stacker ID 13, unique identification information by which the stacker 1 can be identified is recorded or printed. As the stacker ID 13, an IC chip, a two-dimensional barcode or the like may be used.

On a rear R side of the base 12, a main body 16 is disposed vertically upward from the base 12. The main body 16 supports one end of the shelf unit 10 in a cantilever state. A communication unit 18 is disposed on an upper part of the main body 16.

As shown in FIG. 3, the shelf unit 10 of the stacker 1 includes a stacking shelf 22 on which the paper S is directly stacked, and a lifting and lowering table 24 located below the stacking shelf 22. The stacking shelf 22 is a rectangular plate-shaped body in planar view. The stacking shelf 22 includes a stopper (abutment member) 26 and a paper width guide (abutment member) 28.

The stopper 26 is a rod-shaped body disposed vertically upward from the stacking shelf 22, and is disposed on the rear R side of the stacking shelf 22. For example, two stoppers 26 are arranged in a width direction of the stacking shelf 22 as shown in FIG. 1. Note that the width direction of the stacking shelf 22 is a direction orthogonal to a longitudinal direction of the stacking shelf 22 that is a direction connecting a front F and the rear R. A tip of the paper S ejected from the printer 3 abuts on the stopper 26, and the paper S is accordingly positioned in an ejection direction.

Figure 4:
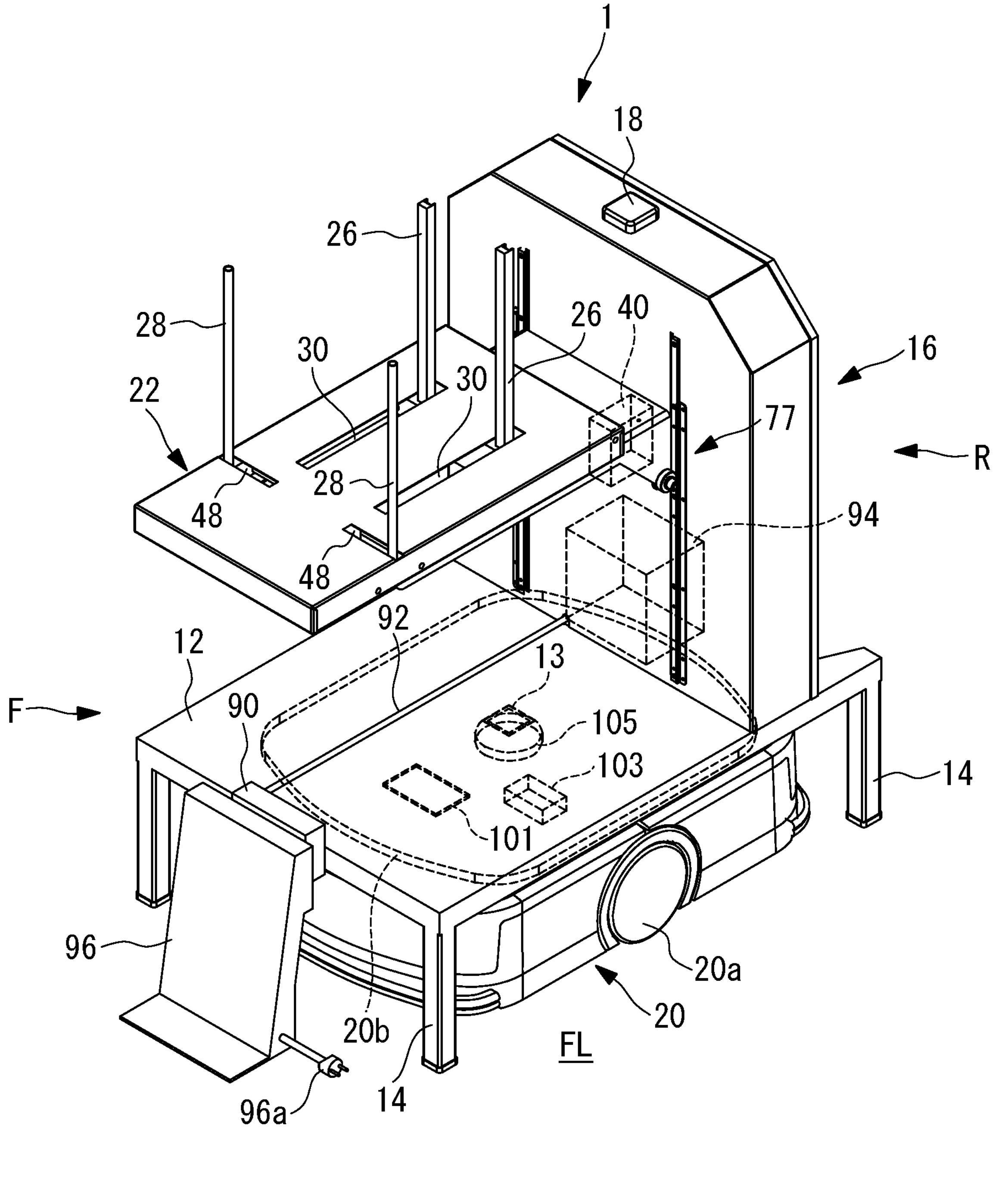
FIG. 4 is a perspective view showing the stacker.

As shown in FIG. 4, a lower end side of each stopper 26 is inserted into each of stopper running grooves 30 formed in the stacking shelf 22. The stopper running groove 30 is formed linearly along the longitudinal direction of the stacking shelf 22. Each stopper 26 reciprocally moves along the stopper running groove 30.

Figure 5:
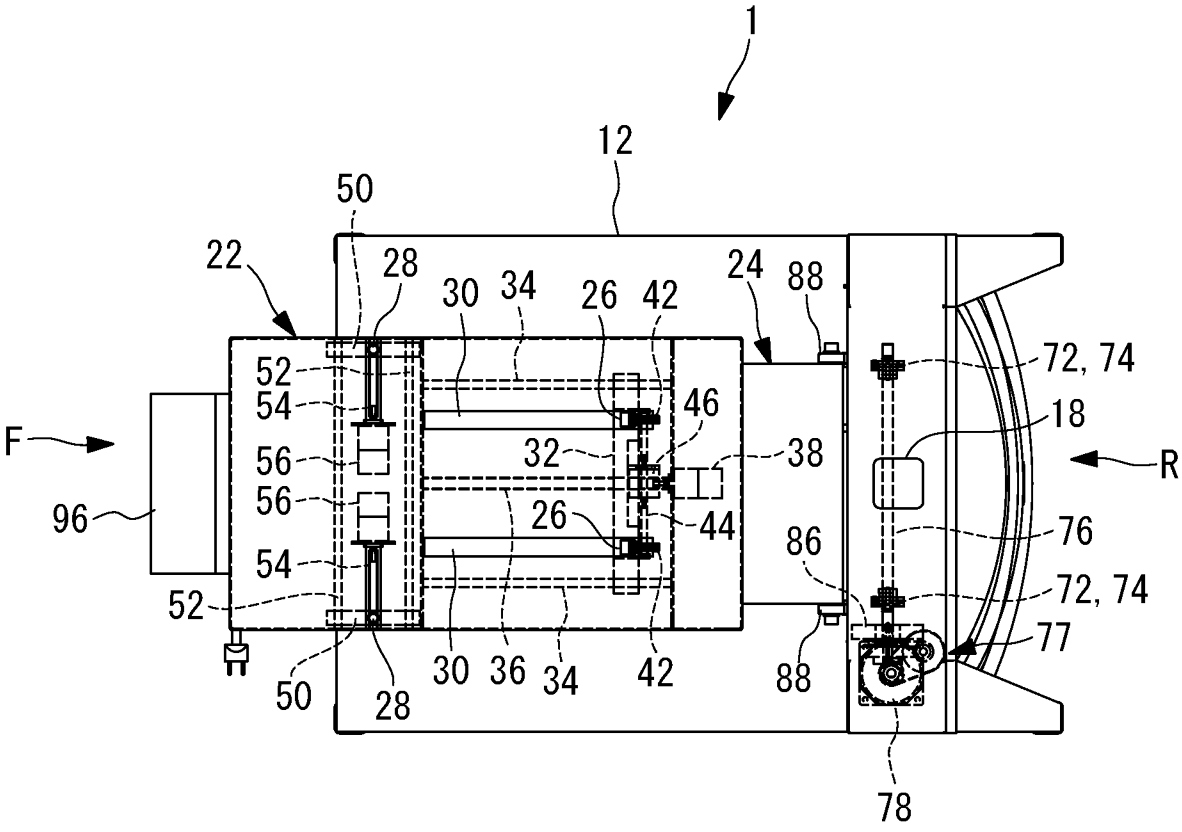
FIG. 5 is a plan view showing the stacker of FIG. 4.
Figure 6:
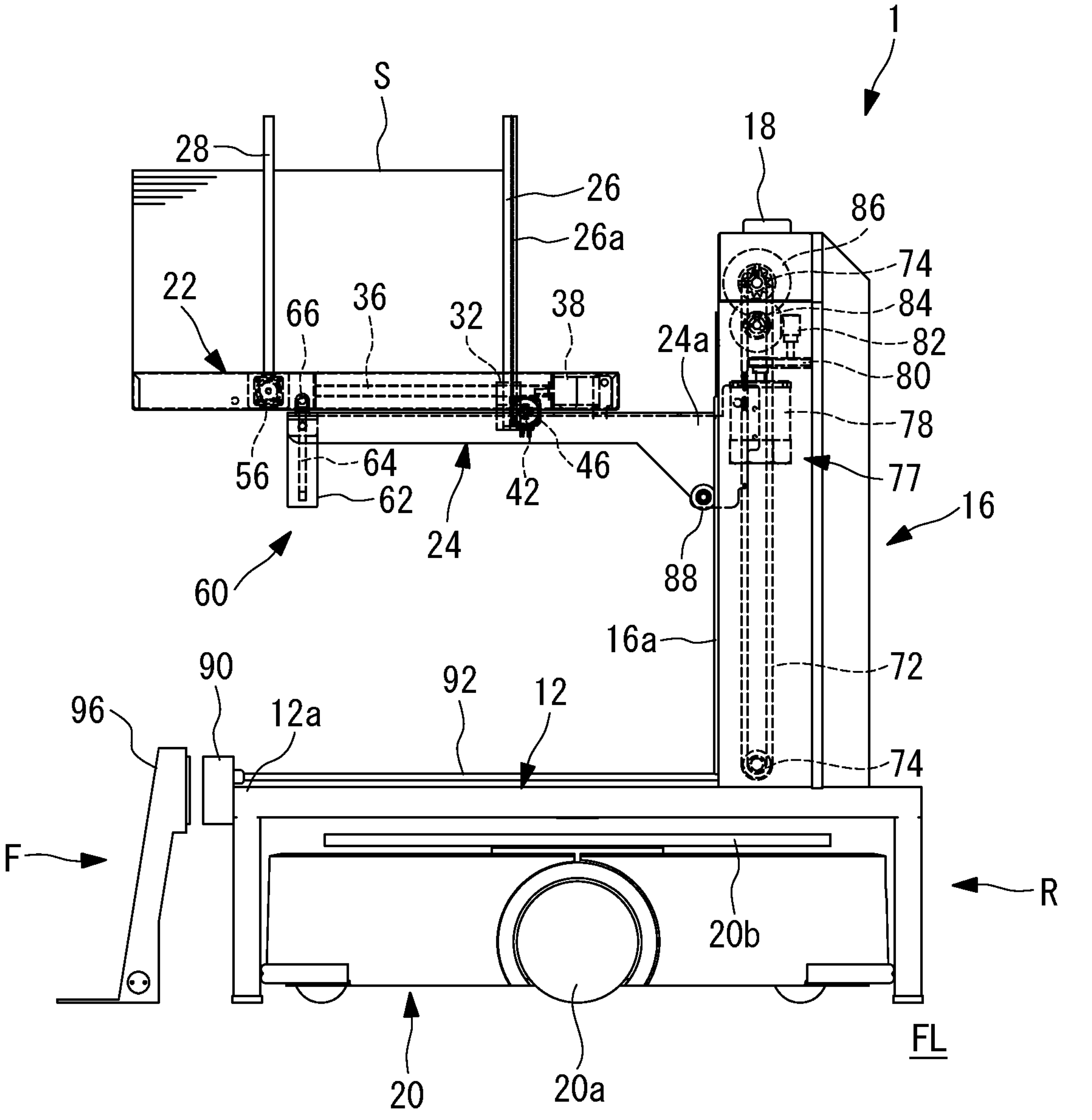
FIG. 6 is a side view showing the stacker of FIG. 4.

As shown in FIG. 5 and FIG. 6, a lower end of the stopper 26 is fixed to a bracket 32 extending in the width direction of the stacking shelf 22. Slide guide shafts 34 are inserted into opposite ends of the bracket 32 in the width direction, respectively. Each slide guide shaft 34 is fixed to a stacking shelf 22 side, and extends in the longitudinal direction of the stacking shelf 22. The bracket 32 is guided along the slide guide shafts 34 to reciprocally move.

The bracket 32 includes a feed screw 36 fixed to a center in the width direction. The feed screw 36 is rotated about an axis by a positioning motor 38 fixed to the rear R side of the stacking shelf 22. The positioning motor 38 is forward and reverse rotatable in accordance with an instruction of a stacker control unit 40 (see FIG. 4). The positioning motor 38 rotates the feed screw 36, to position, in the longitudinal direction, each stopper 26 fixed to the bracket 32.

As shown in FIG. 6, an upper and lower rack 26*a* is disposed in an up-down direction on one side of the rear R side of each stopper 26. A pinion gear 42 disposed in the stacking shelf 22 meshes with each upper and lower rack 26*a*. Each pinion gear 42 is connected to an up-down moving motor 46 via a rotary shaft 44 (see FIG. 5). The pinion gear 42 is rotated forward and reverse by the up-down moving motor 46 via the rotary shaft 44, and each stopper 26 including the upper and lower rack 26*a* accordingly moves in the up-down direction. The up-down moving motor 46 is controlled by the stacker control unit 40 (see FIG. 4).

As shown in FIG. 3, the paper width guide 28 is a rod-shaped body disposed vertically upward from the stacking shelf 22, and is disposed on a front F side of the stopper 26. As shown in FIG. 1, two paper width guides 28 are arranged to be located on opposite sides in the width direction of the paper S.

As shown in FIG. 4, a lower end side of each paper width guide 28 is inserted into each of paper width guide running grooves 48 formed in the stacking shelf 22. Each paper width guide running groove 48 is formed linearly along the width direction of the stacking shelf 22. Each paper width guide 28 reciprocally moves along the paper width guide running groove 48.

As shown in FIG. 5, lower ends of the respective paper width guides 28 are fixed to brackets 50 extending in the longitudinal direction of the stacking shelf 22, respectively. Slide guide shafts 52 are inserted into opposite ends of each bracket 50 in the width direction. Each of the slide guide shafts 52 is fixed to the stacking shelf 22 side, and extends in the width direction of the stacking shelf 22. The bracket 50 is guided by each slide guide shaft 52 to reciprocally move.

Each of feed screws 54 is attached to a center of each bracket 50 in the longitudinal direction. The feed screws 54 are rotated about axes by positioning motors 56 fixed to the stacking shelf 22. Each positioning motor 56 is forward and reverse rotatable in accordance with the instruction of the stacker control unit 40 (see FIG. 4). The positioning motor 56 rotates the feed screw 54, so that each paper width guide 28 fixed to the bracket 50 is positioned in the width direction.

Figure 7:
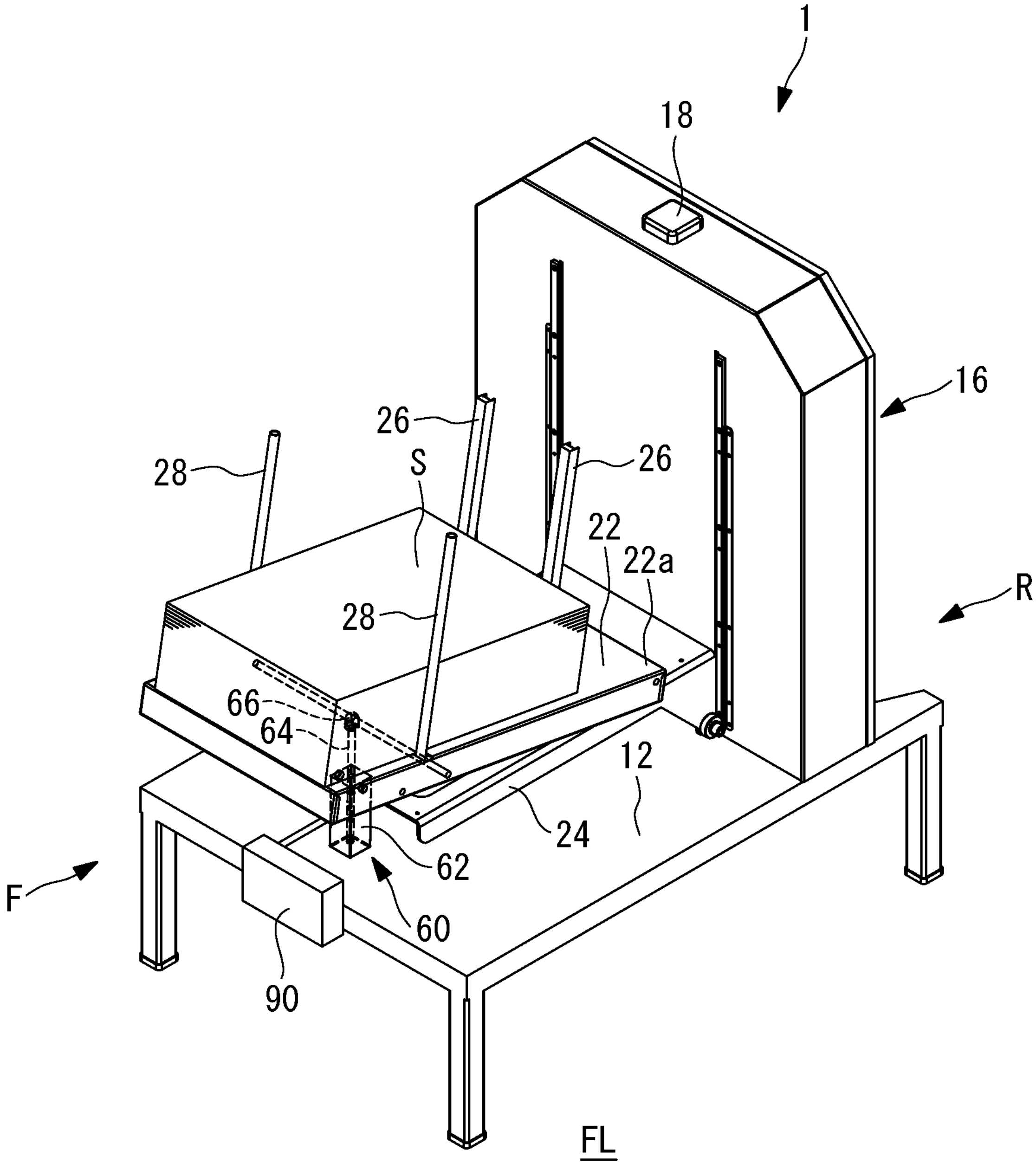
FIG. 7 is a perspective view showing a state where a stacking shelf of the stacker of FIG. 4 is tilted.
Figure 8:
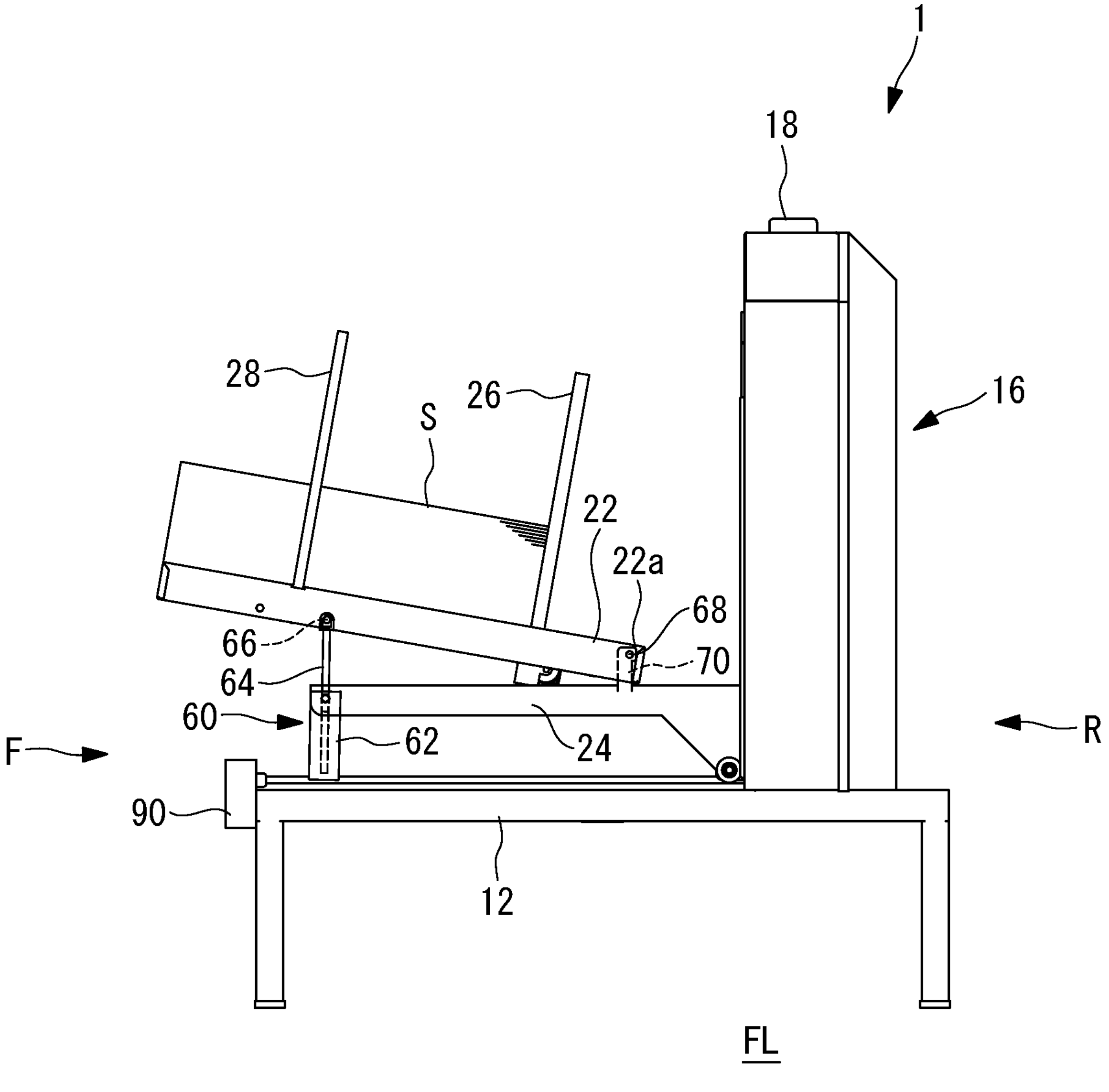
FIG. 8 is a side view of FIG. 7.

As shown in FIG. 6, the stacker 1 includes a tilting mechanism 60 that lifts and tilts the stacking shelf 22 on the front F side to the lifting and lowering table 24. That is, an end portion side (i.e., open side) of the paper S that is not provided with the stopper 26 and each paper width guide 28 is tilted upward. As shown in FIG. 7 and FIG. 8, the tilting mechanism 60 includes a direct-moving cylinder 62 fixed to an end portion of the lifting and lowering table 24 on the front F side, and a rod 64 to be reciprocally moved in the up-down direction by the direct-moving cylinder 62. The direct-moving cylinder 62 is electrically operated, and controlled by the stacker control unit 40 (see FIG. 4). A tip (upper end) of the rod 64 is rotatably fixed to the stacking shelf 22 by a rotating pin 66. A base end portion 22*a* of the stacking shelf 22 on the rear R side is rotatably fixed to the lifting and lowering table 24 by a support pin 68. The support pin 68 is attached to an upper end of an arm part 70 disposed vertically from the lifting and lowering table 24. By the tilting mechanism 60, the stacking shelf 22 is rotated about the support pin 68 to be inclined to the lifting and lowering table 24.

The lifting and lowering table 24 is a rectangular plate-shaped body in planar view, and a base end portion 24*a* in the rear R is connected to the main body 16 to be movable in the up-down direction, for example, as shown in FIG. 6. Specifically, the lifting and lowering table 24 on a base end portion 24*a* side is fixed to a chain 72 disposed in the main body 16 via a bracket. The chain 72 has an endless state, and is hung around between sprockets 74 disposed above and below in the main body 16. The respective sprockets 74 are arranged at opposite ends of a rotary shaft 76 extending in an axial direction in planar view of FIG. 5. Therefore, two chains 72 are provided on each of left and right sides of the main body 16 in the width direction, and each chain 72 is provided with upper and lower sprockets 74.

As shown in FIG. 6, a lifting and lowering mechanism 77 is disposed in the main body 16. The lifting and lowering mechanism 77 includes a motor 78 for the lifting and lowering table. The motor 78 for the lifting and lowering table is controlled to be forward and reverse rotatable by the stacker control unit 40. A rotation output of the motor 78 for the lifting and lowering table is transmitted to a worm gear (lifting and lowering mechanism) 82 via a timing belt 80. A wheel 84 is rotated by the worm gear 82, and consequently, a spur gear 86 meshing with a teeth part of the wheel 84 rotates. The spur gear 86 is fixed to the rotary shaft 76, and the rotary shaft 76 and the sprocket 74 are rotated by the spur gear 86, so that the chain 72 is driven to lift and lower the lifting and lowering table 24.

A wheel 88 is disposed on a lower side of the base end portion 24*a* of the lifting and lowering table 24, and the wheel 88 runs along a front surface 16*a* of the main body 16. Consequently, the lifting and lowering table 24 rises and lowers relative to the main body 16 in the cantilever state.

For example, as shown in FIG. 6, a power receiving head (power receiving device) 90 is disposed in the front F of the stacker 1. The power receiving head 90 is fixed to a front end 12*a* of the base 12. One end of a power cable 92 is electrically connected to the power receiving head 90, and the other end of the power cable 92 is electrically connected to a battery 94 (see FIG. 4) in the main body 16.

Figure 9:
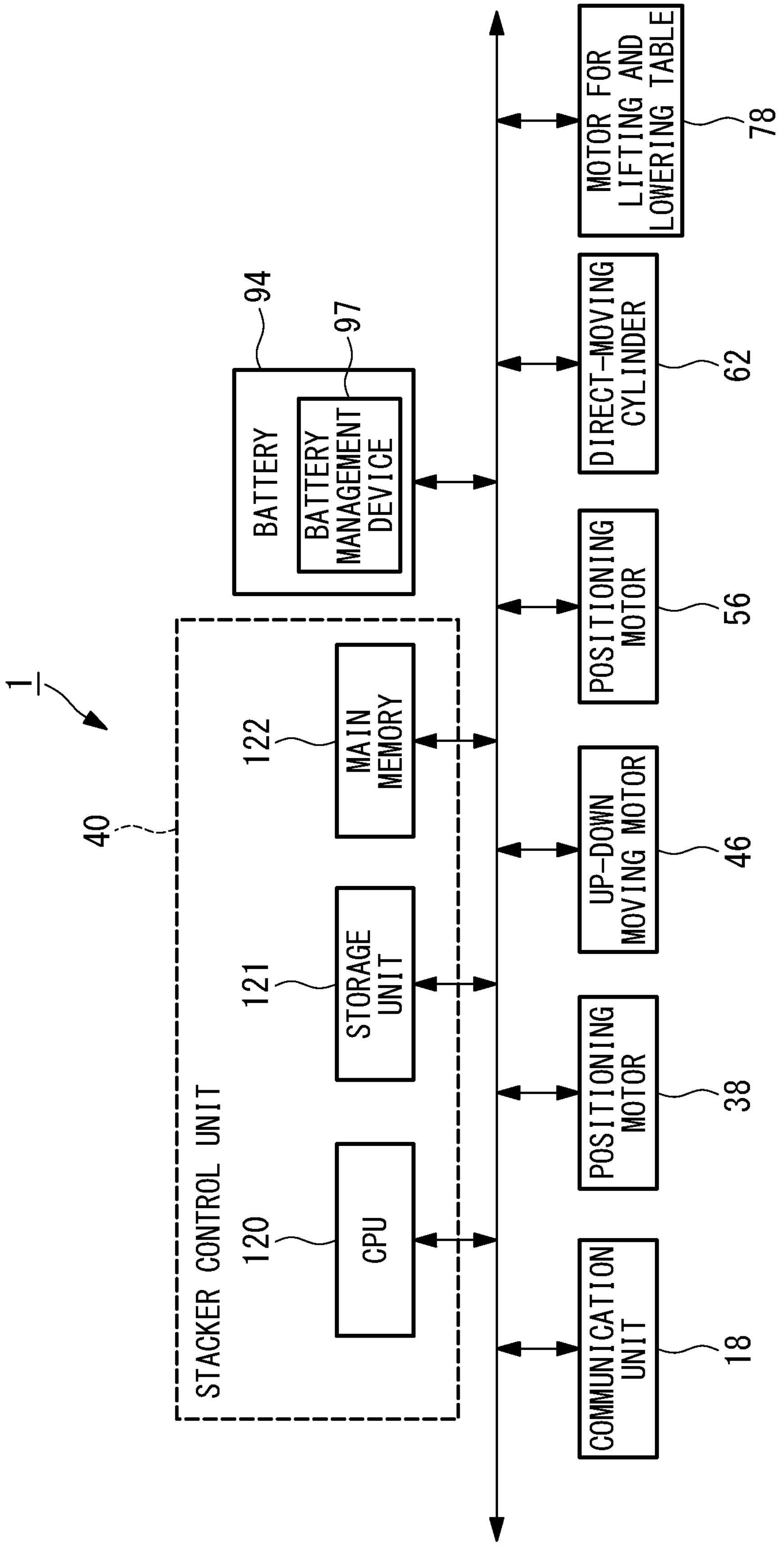
FIG. 9 is a block diagram showing an example of a hardware configuration of the stacker according to an embodiment of the present disclosure.

The battery 94 is, for example, a lithium ion battery, and includes a battery management device 97 (see FIG. 9). The battery management device 97 manages a charged state of the battery 94, and outputs battery information to the stacker control unit 40.

The power receiving head 90 faces a power supply head 96 at a predetermined position such as the receiving position PS1 (see FIG. 1) or the paper supply position PS2 (see FIG. 2). The power receiving head 90 receives power supplied from the power supply head 96, for example, in a noncontact manner. The power supply head 96 is installed at a position corresponding to a stopped position of the stacker 1 to the printer 3 or the paper folding machine 5. The power supply head 96 includes a power outlet 96*a*, and the power outlet 96*a* is connected to a power supply disposed in the vicinity. Note that a power supply method is not limited to the noncontact manner, and may be of a contact type. Also, a position where the power supply head 96 is installed is not limited to the vicinity of the printer 3 or the paper folding machine 5, and the head may be suitably disposed at a predetermined position where the stacker 1 periodically stops.

As shown in FIG. 4, the automatic guided vehicle 20 includes, on an upper surface, a communication unit 101 that performs transmission and reception with the conveyance management device 203 (see FIG. 10) that is a superordinate device, and an ID reader 105. The ID reader 105 reads the stacker ID 13 fixed to the lower surface of the base 12. The communication unit 101 and the ID reader 105 are connected to an automatic conveyance control unit 103 that controls the automatic guided vehicle 20, to transmit and receive a signal to and from the automatic conveyance control unit 103.

In an upper part of the automatic guided vehicle 20, a lifting and lowering platform 20*b* that rises and lowers in the up-down direction is disposed. As the lifting and lowering platform 20*b* rises, the stacker 1 is lifted up from the floor FL, and the automatic guided vehicle 20 runs in this state to convey the stacker 1 to the predetermined position. When the automatic guided vehicle 20 reaches a destination position, the lifting and lowering platform 20*b* is lowered to bring the leg part 14 of the stacker 1 into contact with the floor FL, thereby placing the stacker 1 at the predetermined position. For example, after placing the stacker 1 at the predetermined position, the automatic guided vehicle 20 retreats from below the stacker 1 to move to the next destination. The automatic guided vehicle 20 has a running schedule managed by the conveyance management device 203 (FIG. 10), and the automatic guided vehicle 20 runs in accordance with conveyance instruction information received from the conveyance management device 203.

FIG. 9 is a block diagram showing an example of a hardware configuration of the stacker 1. As shown in FIG. 9, the stacker 1 includes the stacker control unit 40. The stacker control unit 40 includes, for example, a CPU 120, a storage unit 121 that stores program or the like to be executed by the CPU 120, and a main memory 122 that functions as a work area during the execution of each program. The storage unit 121 is, for example, a read only memory (ROM), a hard disk drive (HDD), a flash memory or the like.

A series of processing for achieving the aforementioned various types of control is stored as an example in a program form in the storage unit 121, and the CPU 120 reads this program out to the main memory 122, to execute information processing and arithmetic processing, thereby achieving various types of control. Note that the program may be applied in a form of being installed in advance in the storage unit 121, a form of being provided in a stored state in a computer readable storage medium, a form of being delivered via a wired or wireless communication means, or the like. The computer readable storage medium is a magnetic disk, a magneto-optical disk, a CD-ROM, a DVD-ROM, a semiconductor memory or the like.

Furthermore, the stacker 1 includes the communication unit 18 to achieve communication with an after-mentioned stacker management device (see FIG. 10), the printer 3, and various processing machines (e.g., the paper folding machine 5 and a creasing machine 6). The stacker control unit 40 is connected to the communication unit 18 via a bus, and the communication unit 18 transmits various types of information to a predetermined transmission destination based on the instruction from the stacker control unit 40, and outputs information received from each device to the stacker control unit 40.

For example, the communication unit 18 has a communication function to establish communication along various communication standards depending on the communication destination. As an example, the communication unit 18 communicates with the printer 3 and various processing machines (e.g., the paper folding machine 5, the creasing machine 6 and the like) by use of short range communication such as Bluetooth (registered trademark), and communicates with a comparatively remotely disposed stacker management device 202 (see FIG. 10) and a general printing management device (superordinate control unit) 201 (see FIG. 10) that is a superordinate system of the stacker management device 202 by use of wide area communication (e.g., wireless LAN or the like). Also, the communication unit 18 may communicate with the stacker management device (superordinate control unit) 202 and the general printing management device 201 based on a specific communication protocol for use in a printing field.

Also, the stacker control unit 40 is connected to the aforementioned positioning motors 38 and 56, the up-down moving motor 46, the direct-moving cylinder 62 and the motor 78 for the lifting and lowering table via a bus, to control these respective parts. Specifically, the stacker control unit 40 receives the job information from the stacker management device 202 or the general printing management device 201, and controls the various motors 38, 46, 56 and 78 and the direct-moving cylinder 62 based on the job information.

Further, the stacker control unit 40 is connected to the battery management device (microcomputer) 97 that manages the battery 94 via a bus. The stacker control unit 40 receives the battery information (e.g., a battery remaining capacity or the like) from the battery management device 97, and transmits this battery information to the stacker management device 202 (see FIG. 10) via the communication unit 18.

Figure 10:
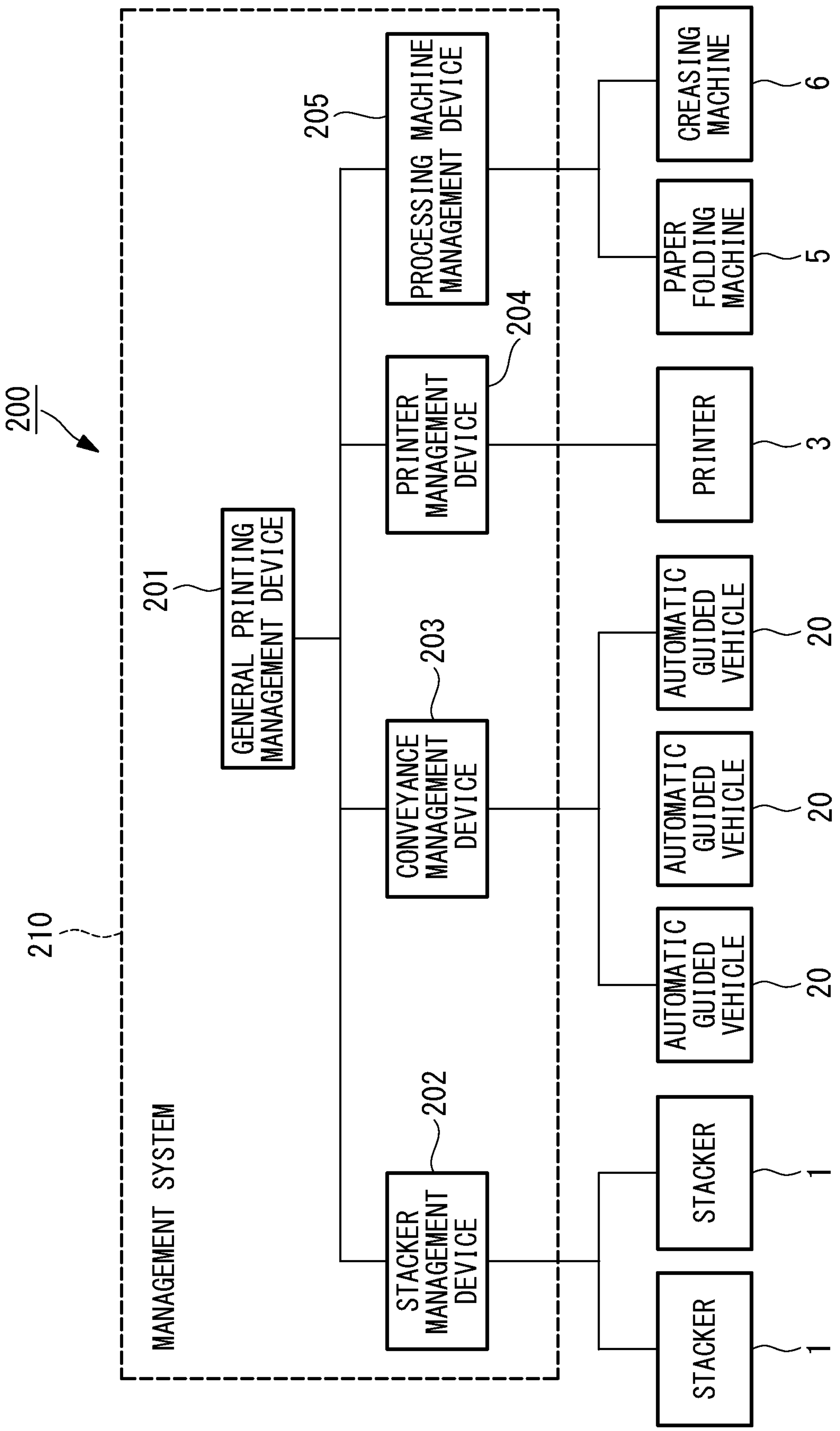
FIG. 10 is a schematic diagram showing an example of an entire configuration of a printing system according to an embodiment of the present disclosure.

FIG. 10 is a schematic diagram showing an example of an entire configuration of the printing system 200 including the stacker 1 and the automatic guided vehicle 20.

As shown in FIG. 10, the printing system 200 includes, as a management system 210, the general printing management device 201, the stacker management device 202, the conveyance management device 203, the printer management device 204, and a processing machine management device 205. The management devices 201 to 205 included in the management system 210 may include a configuration that allows intercommunication.

Also, the printing system 200 includes the stacker 1 managed by the stacker management device 202, the automatic guided vehicle 20 managed by the conveyance management device 203, the printer 3 controlled by the printer management device 204, and various processing machines managed by the processing machine management device 205. FIG. 10 shows the paper folding machine 5 and the creasing machine 6 as examples of the processing machine.

The general printing management device 201 includes a configuration that allows communication with the stacker management device 202, the conveyance management device 203, the printer management device 204, and the processing machine management device 205, and generally manages the whole printing system 200 based on information from these management devices. Note that the general printing management device 201 will be described later in detail.

The stacker management device 202 is a management device including a configuration that allows communication with each of a plurality of stackers 1, and that manages the respective stackers 1. The stacker management device 202 includes, for example, stacker management information associated with stacker ID, operation status, current position information, operating information, and the battery information. The operation status indicates “an operating state” in a case where a job is assigned, and indicates “a standby state” in a case where the job is not assigned. As the current position information, position information of the stacker is registered. As this position information, coordinate information may be registered, or a current position may be specified by association with ID of the printer 3 or the processing machine in a case of receiving ejected paper or supplying paper. The operating information includes total operating time, time elapsed from previous operation, and the like. The battery information includes, for example, a battery charging rate and a battery remaining capacity. The stacker management device 202 communicates with each stacker 1 at a predetermined timing, to receive the operation status, the current position information, the operating information, and the battery information from each stacker 1, and updates the stacker management information based on these pieces of information.

The stacker management device 202 determines one stacker 1 that executes the job based on the aforementioned stacker management information in a case of receiving the job ID and job information from the general printing management device 201. For example, the stacker management device 202 includes a predetermined evaluation formula including, as parameters, the time elapsed from the previous operation, the battery remaining capacity, a distance between equipment designated by the job information (e.g., the printer 3, the paper folding machine or the like) and the current position, and the like. Then, the stacker management device 202 substitutes, into the evaluation formula, the parameters of each stacker 1 indicating “the standby state” as the operation status from the stacker management information, to calculate an evaluation value. Then, the stacker having the highest evaluation value is selected as the stacker that executes the job. Note that in the evaluation formula, the parameter may be weighted depending on an importance degree.

The conveyance management device 203 is a management device that manages an operation of a plurality of automatic guided vehicles (automatic guided conveyance device) 20. The conveyance management device 203 includes a configuration that allows the communication with each automatic guided vehicle 20. Individual automatic guided vehicle IDs are assigned to the automatic guided vehicles 20, respectively. Note that the conveyance management device 203 will be described later in detail.

Each of the general printing management device 201, the conveyance management device 203 and each automatic guided vehicle 20 holds premise map information. This enables the automatic guided vehicle to move to a desired position in response to instructions from the general printing management device 201 and the conveyance management device 203. Also, in this coordinate information, positions of the printer 3 and the respective processing machines (e.g., the paper folding machine 5, the creasing machine 6 and the like) may be registered.

The printer management device 204 is a management device that manages the printer 3. The printer management device 204 outputs, for example, the job information to the printer 3 in a case of receiving the job information from the general printing management device 201. Also, in a case of receiving the job completion signal from the printer 3, the printer management device 204 outputs the job completion signal to the general printing management device 201. Alternatively, the printer management device 204 may store operating information, abnormality detection and the like of the printer 3. These pieces of information are useful information during maintenance and inspection.

The processing machine management device 205 is a management device that manages the processing machine that performs a process on a downstream side of the printer 3. FIG. 1 shows the paper folding machine 5 and the creasing machine 6 as examples of the processing machine, but the processing machine is not limited to these examples. Alternatively, the processing machine management device 205 may store the operating information, abnormality detection and the like of each processing machine.

Note that FIG. 10 illustrates a case where two stackers 1, three automatic guided vehicles 20, one printer 3, one paper folding machine 5 and one creasing machine 6 are included in the printing system 200, but the number of these devices is not limited to an aspect shown in the drawing. That is, there are not any special restrictions on the number as long as at least one device of one type is provided.

Figure 11:
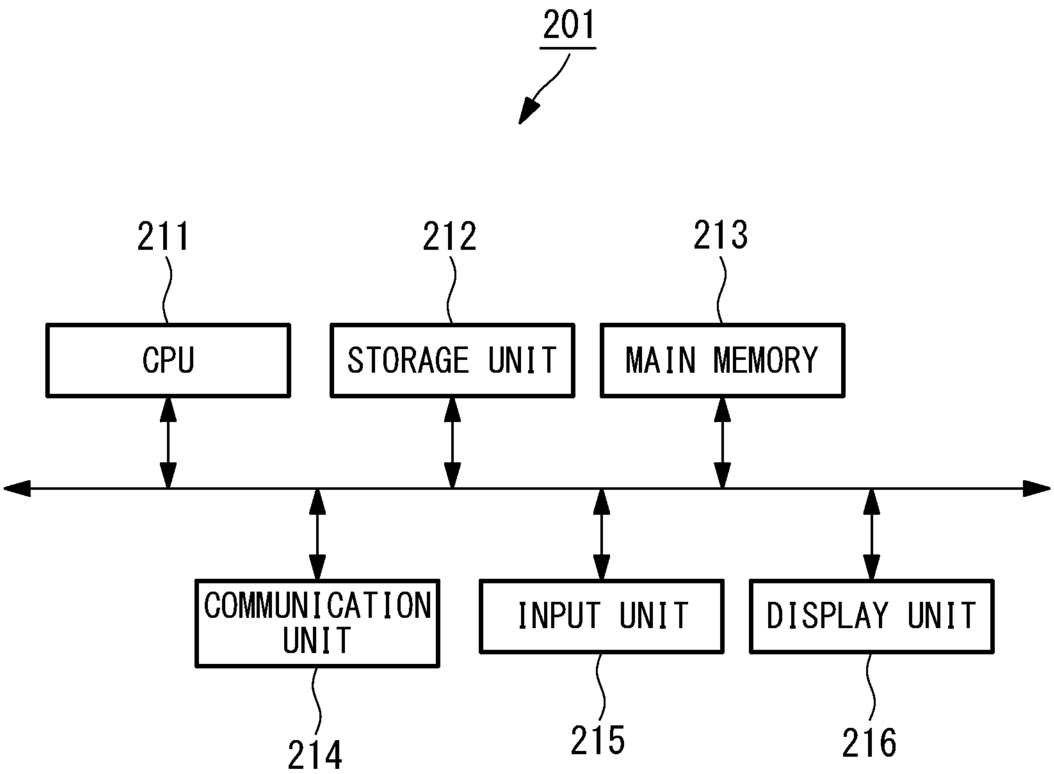
FIG. 11 is a block diagram showing an example of a hardware configuration of a general printing management device according to an embodiment of the present disclosure.

FIG. 11 is a block diagram showing an example of a hardware configuration of the general printing management device 201 according to the present embodiment. As shown in FIG. 11, the general printing management device 201 includes computers, for example, a CPU 211, a storage unit 212, a main memory 213, a communication unit 214, an input unit 215, and a display unit 216.

The CPU 211 controls, for example, the whole printing system 200 with an operating system (OS) stored in the storage unit 212 connected via a bus, and executes various types of program stored in the storage unit 212 to execute various types of processing.

The storage unit 212 is, for example, a read only memory (ROM), a hard disk drive (HDD), a flash memory or the like, and stores, for example, OS for controlling the whole printing system 200, such as Windows (registered trademark), an application for a printing operation, various data or files and the like. Also, the storage unit 212 stores program for achieving various types of processing, and various data required to achieve various types of processing.

The main memory 213 is constituted of a writable memory such as a cache memory or a random access memory (RAM), and is used, for example, as a work area where reading of execution program by the CPU 211, writing of processing data by the execution program or the like is performed.

The communication unit 214 connects to network to communicate with the other devices, and functions as interface for transmitting and receiving information.

The input unit 215 is a user interface for a user to provide the general printing management device 201 with the instruction, for example, a keyboard, a mouse, a touch panel or the like.

The display unit 216 includes a display screen constituted of, for example, a liquid crystal display (LCD), an organic electro luminescence (EL) or the like, and displays results or the like of application software program executed by the CPU 211.

Alternatively, the input unit 215 and the display unit 216 may be connected to the general printing management device 201 via network or the like, and include a configuration that allows a remote input operation and remote display.

Further, a hardware configuration of each of the stacker management device 202, the conveyance management device 203, the printer management device 204 and the processing machine management device 205 is a configuration substantially similar to the general printing management device 201. That is, each of the management devices 202 to 205 also includes a CPU, a main memory, a storage unit, a communication unit, an input unit, a display unit and the like. Alternatively, the input unit and the display unit may include a configuration that allows the remote operation.

Next, description will be made as to functions of the general printing management device 201 according to the present embodiment. A series of processing for achieving various functions to be described later is stored, as an example, in a program form in the storage unit 212 shown in FIG. 11, and the CPU 211 reads this program out to the main memory 213, and executes information processing and arithmetic processing, to achieve various functions. Note that the program may be applied in a form of being installed in advance in the storage unit 212, a form of being provided in a stored state in a computer readable storage medium, a form of being delivered via a wired or wireless communication means, or the like. The computer readable storage medium is a magnetic disk, a magneto-optical disk, a CD-ROM, a DVD-ROM, a semiconductor memory or the like.

Figure 12:
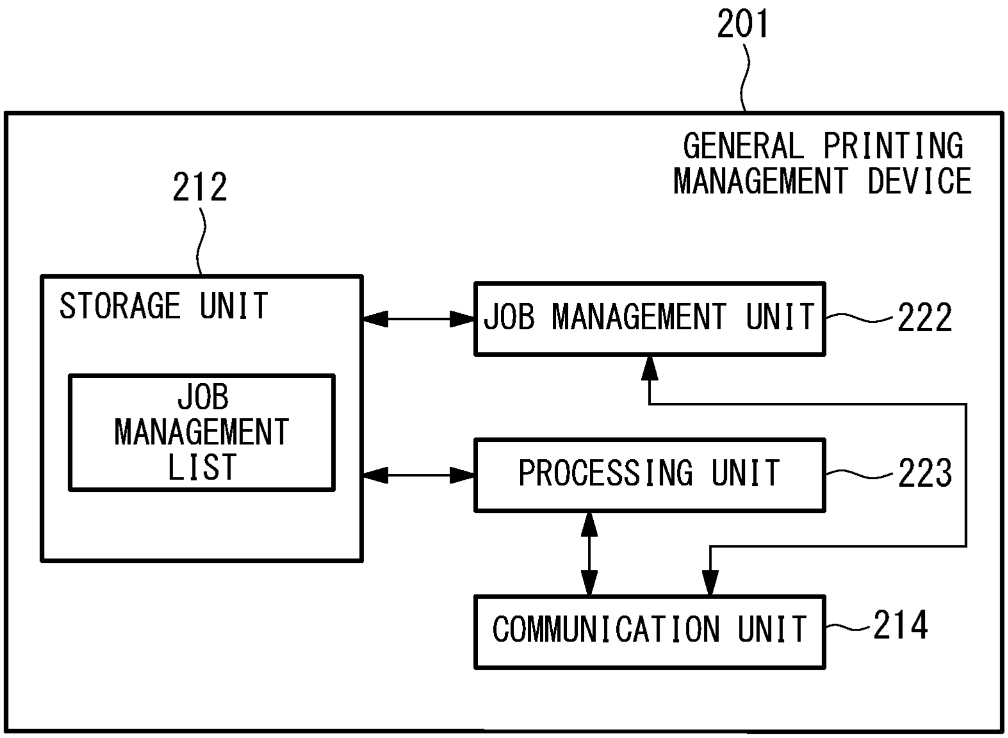
FIG. 12 is a functional block diagram showing an example of a function included in the general printing management device according to an embodiment of the present disclosure.

FIG. 12 is a functional block diagram showing an example of a function included in the general printing management device 201. As shown in FIG. 12, the general printing management device 201 includes, for example, the storage unit 212, a job management unit 222, a processing unit 223, and the communication unit 214.

The storage unit 212 stores a job management list. The job management list is a list in which a manufacturing schedule of a printed product to be manufactured by the printing system 200 is registered. In the job management list, for example, for each job ID (job identification information) assigned to the printed product, job information including a registered manufacturing process procedure for manufacturing the printed product, job status and the like are registered.

The job information includes various types of information required for manufacturing the printed product, such as paper information and work information.

The paper information includes, for example, a paper size, a paper thickness, the number of sheets to be printed, the number of paper sheets to be included in the printed product, the number of copies of printed product to be prepared and the like.

The work information includes a manufacturing process procedure of the printed product, ID of a printing machine for use in a manufacturing process and set parameters.

For example, in a case of folding printed paper, the manufacturing process procedure of the printer 3 and the paper folding machine 5 in this order is registered. Also, set parameters such as a shelf height and a guide position are registered as the work information in association with printer ID of the printer 3. Further, processing specification associated with paper folding machine ID of the paper folding machine 5, offset information of the paper supply position for each paper folding machine ID and the like are registered.

Also, as the job information, for example, JDF described in a standard format in a printing technology field may be used.

As the job status, “completed”, “being executed”, “incomplete” or the like is registered for each manufacturing process (e.g., “printing”, “paper folding” or the like) of the printed product.

The job management unit 222 performs new addition, update, deletion and the like of the job management list stored in the storage unit 212. For example, in a case where a new printed product manufacturing request is accepted via the input unit 215 (see FIG. 11) or the communication unit 214, a requested printed product is provided with the job ID, and the job information is registered in the job management list, to update the job management list.

Furthermore, in a case where the job completion signal is accepted via the communication unit 214, the job status of the job management list is updated based on the job completion signal. Consequently, a completed job, an incomplete job and a job that is being executed can be determined, and as to the job that is being executed, it is possible to determine to which process the job is completed. Consequently, job progress can be managed.

The processing unit 223 prepares instruction information to be transmitted to each of the management devices 202 to 205 based on the job management list. The respective management devices 202 to 205 operate various devices under management based on the instruction information, to stably and smoothly proceed with a printing process in the printing system 200 based on the job information. Note that description will be made later as to a series of processing procedure to be executed by the processing unit 223.

The communication unit 214 transmits various types of instruction information and the like prepared by the processing unit 223 to a transmission destination designated by the processing unit 223, and outputs the information received from various management devices 202 to 205 and the like to the processing unit 223.

Figure 13:
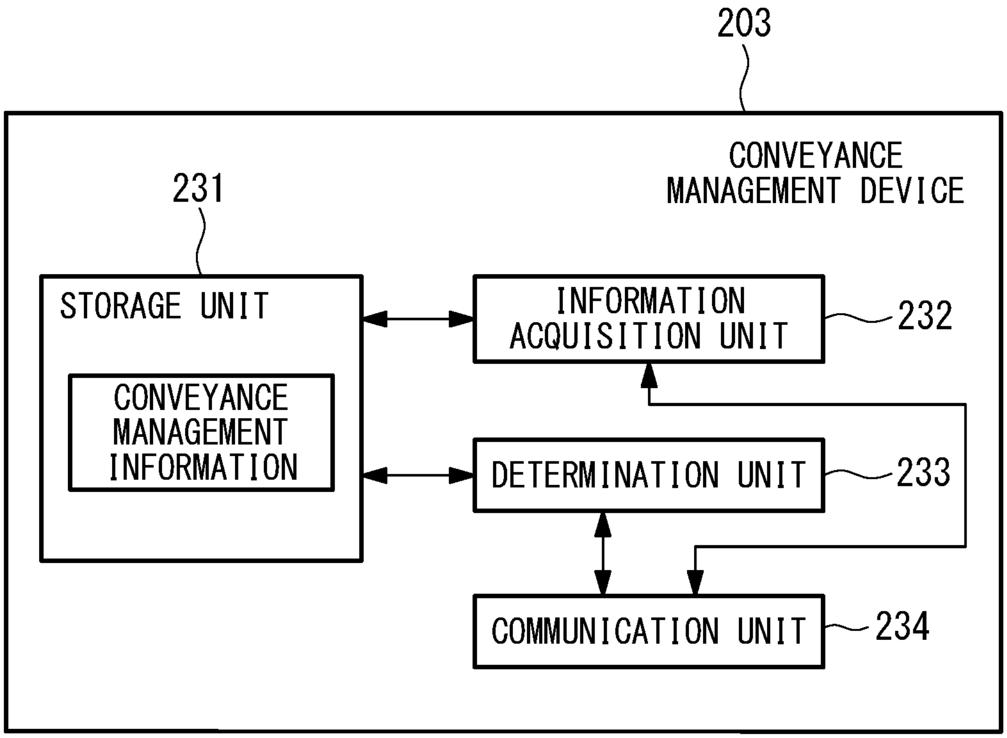
FIG. 13 is a functional block diagram showing an example of a function included in a conveyance management device according to an embodiment of the present disclosure.

FIG. 13 is a functional block diagram showing an example of a function included in the conveyance management device 203 according to the present embodiment.

The conveyance management device 203 includes a storage unit 231, an information acquisition unit 232, a determination unit 233, and a communication unit 234.

The storage unit 231 stores, for example, conveyance management information associated with the automatic guided vehicle ID, operation status, current position information, operating information, battery information and the like.

The operation status indicates "an operating state" in a case where stacker conveyance is assigned at present, indicates "a standby state" in a case where the stacker conveyance is not assigned, and indicates "charging" in a case where the vehicle is being charged. As the current position information, position information of the automatic guided vehicle 20 is registered. The operating information includes, for example, total operating time, time elapsed from previous operation, and the like. The battery information includes, for example, a battery charging rate and a battery remaining capacity.

Note that various types of information included in the aforementioned conveyance management information are illustrated as an example, and part of the information may be registered, or another parameter may be additionally registered.

The information acquisition unit 232 communicates with each automatic guided vehicle 20 at a predetermined timing, and acquires the aforementioned battery information, current position information and operating information, to update the conveyance management information stored in the storage unit 231.

The determination unit 233 determines one automatic guided vehicle 20 that conveys the stacker 1 based on the conveyance management information stored in the storage unit 231, in a case of receiving, from the general printing management device 201, conveyance instruction information including stacker ID of the stacker as a conveyance target, position information and conveyance destination information. For example, the conveyance management device 203 includes a predetermined evaluation formula including, as parameters, time elapsed from the previous operation, total operating time, battery remaining capacity, a distance between the position information of the stacker 1 of the conveyance target and the position information, and the like. Then, the parameters of the automatic guided vehicle 20 including the current operation status indicating "the standby state" are acquired from the conveyance management information, and substituted into the evaluation formula, to calculate an evaluation value. Then, the automatic guided vehicle 20 having the highest evaluation value is selected as the automatic guided vehicle that executes the conveyance instruction information. Note that in the evaluation formula, the parameter may be weighted depending on an importance degree.

The communication unit 234 establishes communication with the automatic guided vehicle 20 and communication with the general printing management device 201, to achieve intercommunication.

Next, description will be made as to printed product manufacturing management processing to be executed by the management system 210 including the general printing management device 201, with reference to the drawings.

Figure 14:
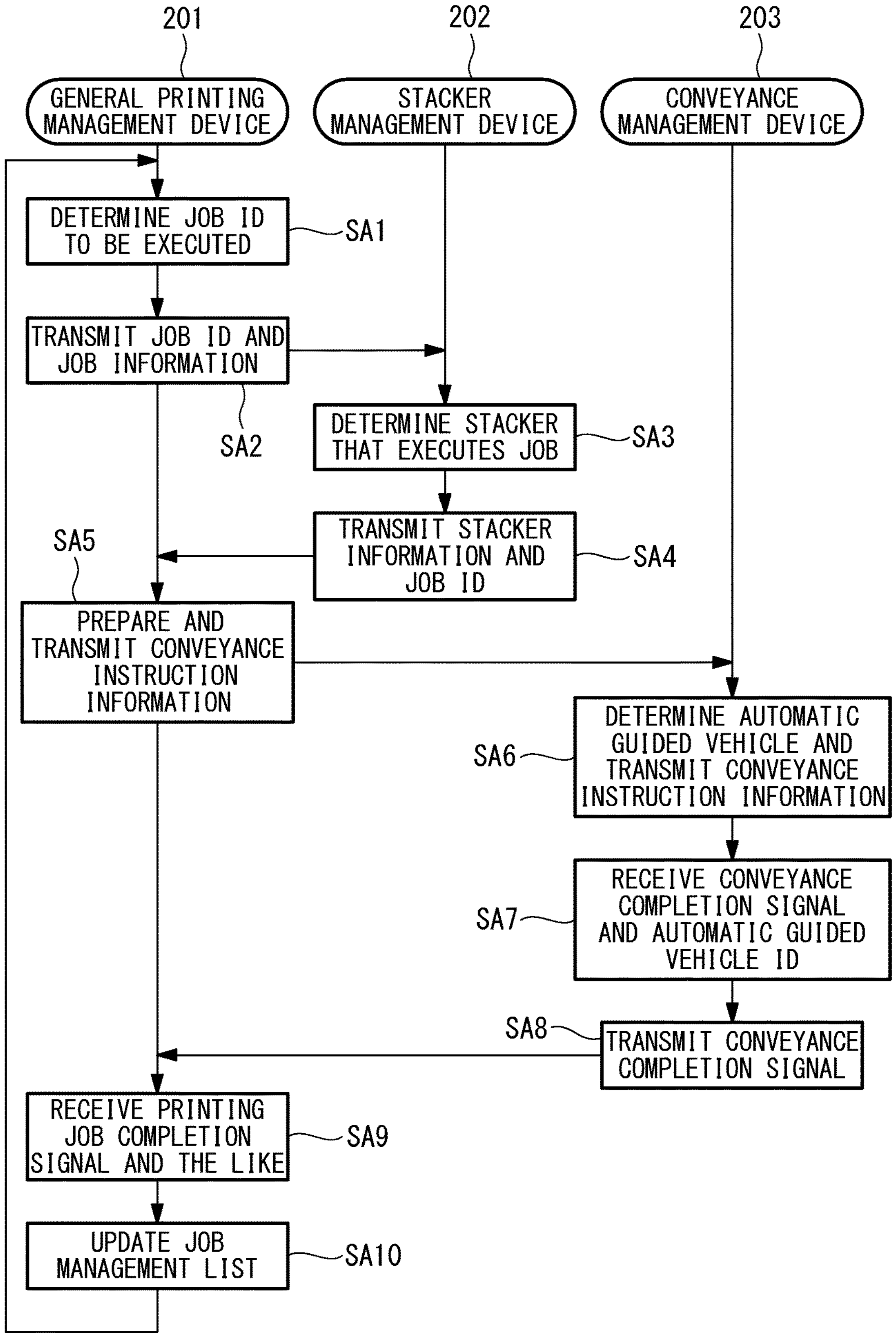
FIG. 14 is a flowchart mainly showing an example of a procedure of processing to be executed by the general printing management device, a stacker management device, and a conveyance management device in printed product manufacturing management processing of a management system concerning a printing process according to an embodiment of the present disclosure.
Figure 15:
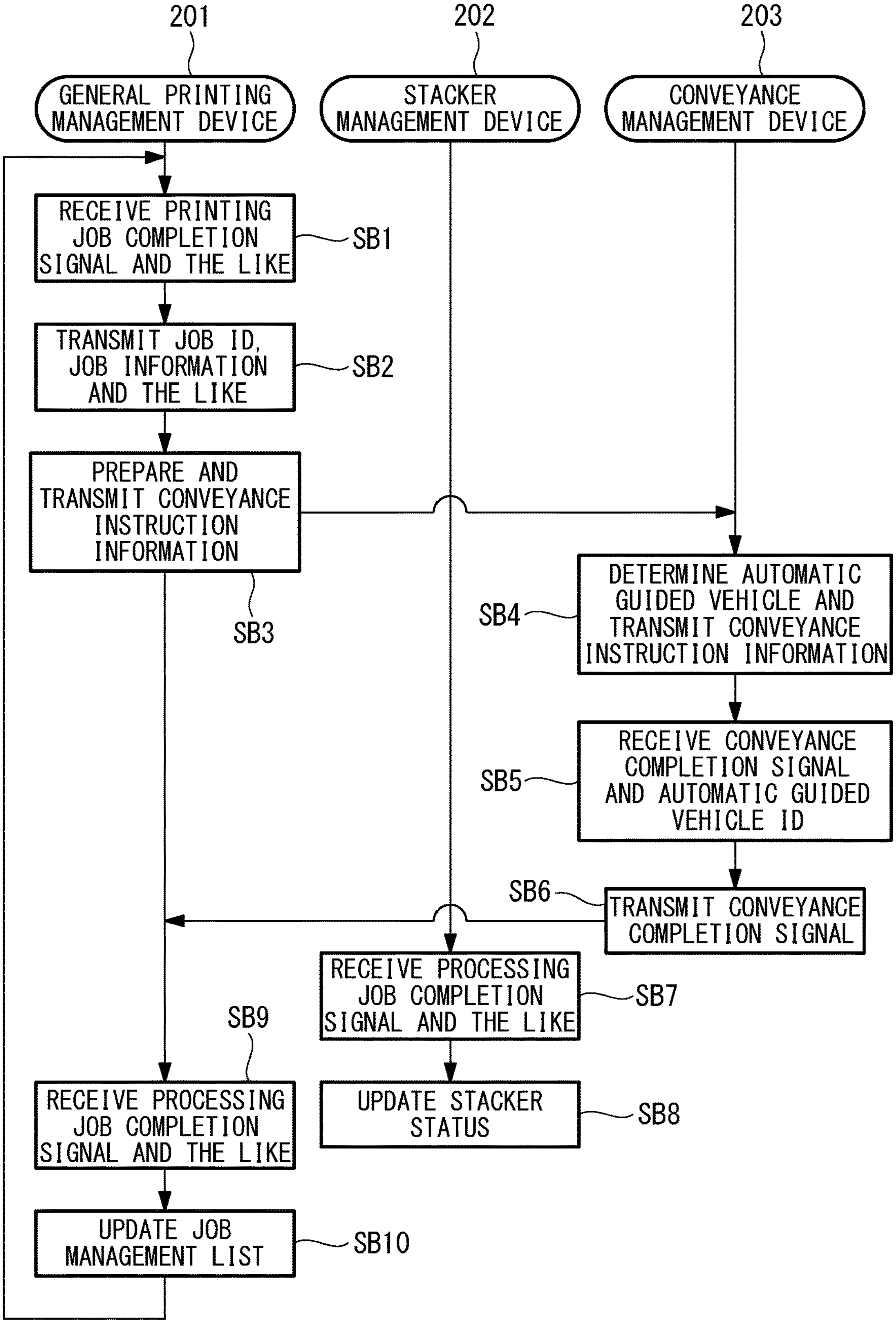
FIG. 15 is a flowchart mainly showing an example of a procedure of processing to be executed by the general printing management device, the stacker management device, and the conveyance management device in the printed product manufacturing management processing of the management system concerning a processing process according to an embodiment of the present disclosure.

FIG. 14 is a flowchart mainly showing an example of a procedure of processing to be executed by the general printing management device 201, the stacker management device 202, and the conveyance management device 203 in the printed product manufacturing management processing of the management system 210 concerning the printing process. FIG. 15 is a flowchart mainly showing an example of a procedure of processing to be executed by the general printing management device 201, the stacker management device 202, and the conveyance management device 203 in the printed product manufacturing management processing of the management system 210 concerning a processing process.

As shown in FIG. 14, first, the general printing management device 201 determines the job ID to start manufacturing of a printed product based on the job management list (SA1). Then, the device transmits the determined job ID and job information associated with the job ID to the stacker management device 202 and the printer management device 204 (see FIG. 10) (SA2). The printer management device 204 transmits the received job ID and job information to the printer 3. The printer 3 receiving the job ID and job information is in the standby state until receiving a preparation completion signal from the stacker 1.

On the other hand, on receiving the job ID and job information from the general printing management device 201, the stacker management device 202 determines the stacker 1 that executes the job, based on the stacker management information (SA3), and associates the stacker information including the stacker ID and current position information of the determined stacker 1 with the job ID to transmit the associated information to the general printing management device 201 (SA4). Also, the stacker management device 202 transmits the job ID and job information to the determined stacker 1. Further, the stacker management device 202 changes the operation status of the stacker 1 to which the job is assigned to "the operating state" in the stacker management information.

The stacker control unit 40 (see FIG. 9) of the stacker 1 receiving the job ID and job information controls the motor 78 for the lifting and lowering table based on the job information. Consequently, the motor 78 for the lifting and lowering table operates, and positions the lifting and lowering table at a height position (first predetermined height) individually set depending on the type of printer 3. Therefore, it is possible to appropriately receive the paper ejected from the printer 3 during the printing. Also, the stacker control unit 40 controls the positioning motors 38 and 56 and the up-down moving motor 46. Consequently, a position of the stopper 26 in a front-rear direction and a position of the paper width guide 28 in the width direction are determined at positions corresponding to a size of the paper S that is described in a printing job.

On the other hand, in FIG. 14, on receiving the stacker information and job ID from the stacker management device 202, the general printing management device 201 prepares the conveyance instruction information based on the received stacker information, job ID and job information, to transmit the information to the conveyance management device 203 (SA5). The conveyance instruction information includes the current position information of the stacker 1, the stacker ID, and information of the receiving position PS1 of the printer 3.

The conveyance management device 203 determines the automatic guided vehicle 20 that conveys the stacker 1, based on the conveyance instruction information and conveyance management information, and transmits the conveyance instruction information to the determined automatic guided vehicle 20 (SA6). Also, the conveyance management device 203 changes the operation status of the automatic guided vehicle 20 to which the conveyance instruction is assigned to "the operating state" in the conveyance management information.

The automatic guided vehicle 20 receiving the conveyance instruction information moves the stacker 1 to the receiving position PS1 of the printer 3 based on the conveyance instruction information. Note that when the automatic guided vehicle 20 reaches the position of the stacker 1, the stacker ID 13 may be read by the ID reader 105, and it may be checked whether or not the stacker ID included in the conveyance instruction information matches the stacker ID read by the ID reader 105. Thus, the checking is performed, so that the stacker 1 that is the target of the conveyance instruction can be securely moved, for example, even in a case where a plurality of stackers 1 are arranged close to each other.

On placing the stacker 1 at the receiving position PS1 of the printer 3 based on the conveyance instruction information, the automatic guided vehicle 20 transmits a conveyance completion signal to the stacker 1, and transmits the conveyance completion signal and the automatic guided vehicle ID of its own to the conveyance management device 203. Note that the automatic guided vehicle 20 may transmit the conveyance completion signal to the stacker 1 via the conveyance management device 203 and the stacker management device 202. Alternatively, communication between the automatic guided vehicle 20 and the stacker 1 to be described hereinafter may be directly mutually performed, or may be indirectly mutually performed via the conveyance management device 203 and the stacker management device 202.

On receiving the conveyance completion signal and the automatic guided vehicle ID (SA7), the conveyance management device 203 transmits the conveyance completion signal to the general printing management device 201 (SA8). Furthermore, the conveyance management device 203 acquires the battery information of the automatic guided vehicle 20 receiving the conveyance completion signal, and determines whether or not the battery remaining capacity is equal to or less than a predetermined lower limit value. As a result, in a case where the battery remaining capacity is equal to or less than the lower limit value, the device transmits, to the automatic guided vehicle 20, charging instruction information for guiding the vehicle to a battery station, and changes the operation status of the conveyance management information to "a charging state". Further, in a case where the battery remaining capacity is in excess of the lower limit value, the operation status is changed to "a standby state".

On the other hand, for example, the stacker 1 receiving the conveyance completion signal from the automatic guided vehicle 20 transmits the preparation completion signal to the printer 3. Also, the battery 94 (see FIG. 9) of the stacker 1 receives power supply from the power supply head 96 disposed in the vicinity of the printer 3 via the power receiving head 90 as required.

On receiving the preparation completion signal from the stacker 1, the printer 3 starts printing based on the job information received from the printer management device 204. The printer 3 transmits a printing start signal to the printer management device 204. The printer management device 204 manages a status. Alternatively, the printer management device 204 may transmit the printing start signal to the general printing management device 201.

Near the paper ejection port 3*b* of the printer 3, a sensor that detects ejected paper is disposed. The printer 3 counts the number of sheets to be printed based on a detection signal from the sensor, and transmits the count number to the stacker 1. The stacker control unit 40 of the stacker 1 controls the motor 78 for the lifting and lowering table based on the count number and the paper thickness acquired from the job information. Consequently, the lifting and lowering table can lower depending on the number of stacked sheets, and receive the paper ejected from the printer 3 at an appropriate position.

On receiving that the count number reaches the number of sheets to be printed prescribed in the job information, the printer 3 transmits a printing job completion signal to the stacker 1 disposed at the receiving position PS1 and the printer management device 204.

On receiving the printing job completion signal, the stacker control unit 40 (see FIG. 9) of the stacker 1 controls the motor 78 for the lifting and lowering table, and lowers the lifting and lowering table to a position during moving. Furthermore, the stacker control unit 40 controls the direct-moving cylinder 62, to place the stacking shelf 22 in an inclined state at a predetermined angle, and prepares for the next process of conveyance to the processing machine. For example, as shown in FIG. 7 and FIG. 8, the tilting mechanism 60 of the stacker 1 brings a state where the front F side of the stacking shelf 22 is disposed above the rear R side. Consequently, when the automatic guided vehicle 20 conveys the stacker 1 toward the front F, the paper S stacked on the stacking shelf 22 can be prevented from scattering and falling from the open side that is not provided the stopper 26 and the respective paper width guides 28.

On the other hand, on receiving the printing job completion signal from the printer 3, the printer management device 204 transmits the printer ID, job ID and printing job completion signal to the general printing management device 201.

On receiving the printing job completion signal or the like (SA9), the general printing management device 201 changes a printing process status of the job ID of the job management list to "completed" to update the job management list (SA10). Then, the device returns to the step SA1, and determines the job ID to be next executed from the job management list. Consequently, a printing process of the job ID to be next executed is executed, and the aforementioned processing of the determined job is performed.

Furthermore, on receiving the printing job completion signal as described above (SB1 of FIG. 15), the general printing management device 201 specifies the processing machine (e.g., the paper folding machine 5) that executes the processing process from the job information associated with the job ID that receives the printing job completion signal, and transmits processing machine ID, job ID and job information to the processing machine management device 205 (SB2). Note that at this time, stacker ID of the stacker 1 that supplies paper to the processing machine may be transmitted together.

The processing machine management device 205 that receives these pieces of information transmits the job ID, job information and stacker ID to the processing machine (e.g., the paper folding machine 5) specified from the processing machine ID. For example, on receiving the job ID and job information, the paper folding machine 5 changes setting based on the job information, and is in the standby state for the job until the stacker 1 moves to be disposed at the paper supply position PS2.

Furthermore, the general printing management device 201 prepares conveyance instruction information for moving the stacker 1 disposed at the receiving position PS1 of the printer 3 to the paper supply position of the paper folding machine 5, and transmits the information to the conveyance management device 203 (SB3). The conveyance instruction information may include stacked paper information (e.g., a paper size, paper thickness, and the number of paper sheets) of the stacker ID in addition to the stacker ID and current position information of the stacker. Also, the conveyance instruction information may include offset information to the paper supply position of the paper folding machine 5. Alternatively, the conveyance instruction information may include information concerning a paper supply direction to the paper folding machine 5 (e.g., a vertical direction or a lateral direction or the like). Alternatively, as the current position information of the stacker, position information of the receiving position PS1 of the printer 3 may be used.

The conveyance management device 203 determines the automatic guided vehicle 20 that conveys the stacker 1, based on the conveyance instruction information and conveyance management information, and transmits the conveyance instruction information to the determined automatic guided vehicle 20 (SB4). The automatic guided vehicle 20 receiving the conveyance instruction information moves the stacker 1 from the receiving position PS1 of the printer 3 to the paper supply position PS2 of the paper folding machine 5 based on the conveyance instruction information. Note that when the automatic guided vehicle 20 reaches the position of the stacker 1, the stacker ID 13 may be read by the ID reader, and it may be checked whether or not the stacker ID included in the conveyance instruction information matches the stacker ID read by the ID reader 105.

Furthermore, during the conveyance by the automatic guided vehicle 20, the stacking shelf 22 in the stacker 1 is inclined at the predetermined angle, so that the paper S stacked on the stacking shelf 22 can be prevented from scattering and falling, and it is possible to achieve stable running.

Alternatively, in the automatic guided vehicle 20, acceleration or speed during the conveyance may be adjusted depending on the paper information included in the conveyance instruction information. For example, a stacking weight of paper to be stacked by the stacker 1 can be estimated based on the number of the paper sheets, paper size and paper thickness. In the automatic guided vehicle 20, the acceleration or speed is adjusted depending on a total weight of the stacker 1 that is obtained from these pieces of information, to achieve the stable running. Note that the conveyance management device 203 may estimate the stacking weight of the paper from the paper information such as the number of the paper sheets, and the conveyance instruction information to be transmitted to the automatic guided vehicle 20 may include estimated stacking information.

The automatic guided vehicle 20 moves the stacker 1 to the paper supply position PS2 of the paper folding machine 5, and controls orientation of the stacker 1 so that the paper supply direction of the stacker 1 is appropriate, based on information concerning the paper supply direction to the paper folding machine 5, the information being included in the conveyance instruction information. Consequently, even in a case where an ejection orientation of the sheet in the printer 3 is different from a paper supply orientation of the sheet in the paper folding machine 5, the stacker 1 can be installed with an appropriate orientation to obtain an appropriate paper supply orientation depending on the paper supply orientation in the paper folding machine 5.

Figure 16:
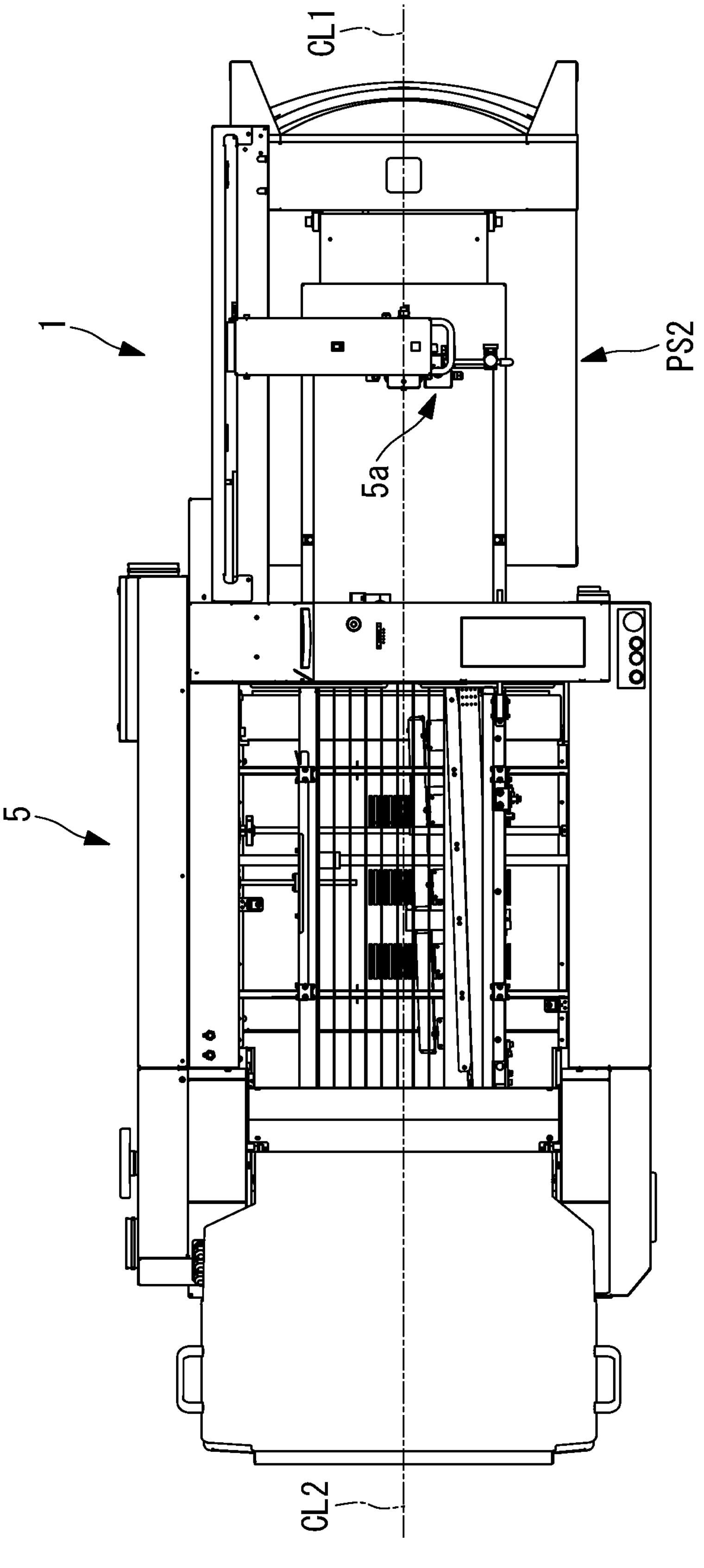
FIG. 16 is a plan view showing a state where a center line of the paper folding machine coincides with a center line of the stacker at the paper supply position.
Figure 17:
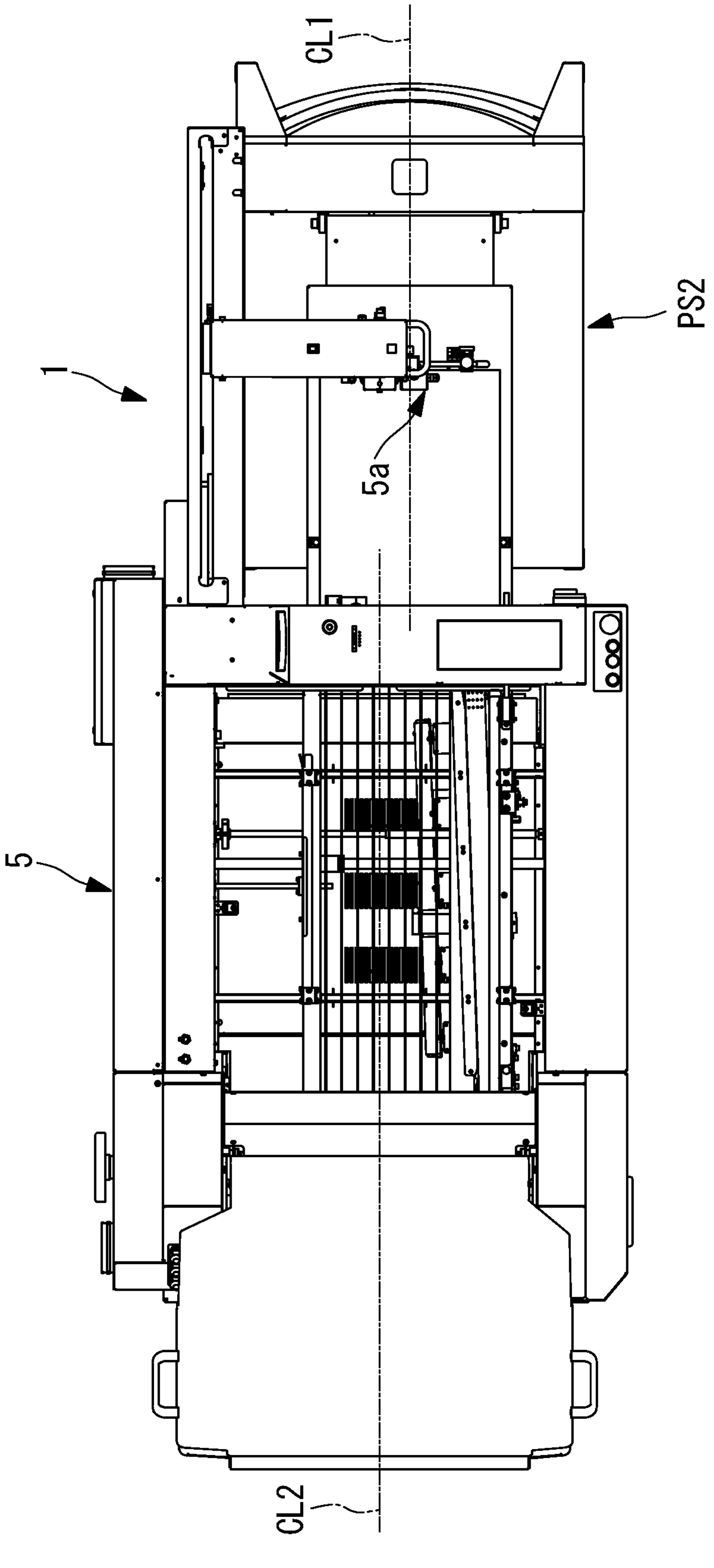
FIG. 17 is a plan view showing a state where the center line of the stacker is offset from the center line of the paper folding machine at the paper supply position.

Furthermore, the automatic guided vehicle 20 adjusts a position of a center line CL1 of the stacker 1 to a center line CL2 of the paper folding machine 5 in planar view, based on the offset information included in the conveyance instruction information. For example, a positional relation between the center line CL1 of the stacker 1 and the center line CL2 of the paper folding machine 5 varies depending on whether a desired folding position is a center of the paper or offset from the center of the paper, relative to the paper folding machine 5 in which a position of a knife (not shown) for folding the paper is on the center line CL2. Therefore, the paper supply position PS2 of the stacker 1 varies with the paper folding machine 5, paper size or desired folding position. For the paper supply position PS2, as described above, the stacker control unit 40 and/or the automatic conveyance control unit 103 obtains appropriate setting information from the general printing management device 201 or the conveyance management device 203. Note that the paper folding machine 5 and the stacker control unit 40 and/or the automatic conveyance control unit 103 may directly communicate. For example, the automatic guided vehicle 20 places the stacker 1 at a position at which the center line CL2 of the paper folding machine 5 coincides with the center line CL1 of the stacker 1 in planar view as shown in FIG. 16, in a case where offset is zero. Also, the automatic guided vehicle 20 places the stacker 1 at a position at which the center line CL1 of the stacker 1 is offset from the center line CL2 of the paper folding machine 5 as shown in FIG. 17, depending on the offset in a case where the offset is not zero.

On placing the stacker 1 at the paper supply position PS2 depending on the offset information, the automatic guided vehicle 20 transmits the conveyance completion signal to the stacker 1, and transmits the conveyance completion signal and the automatic guided vehicle ID of its own to the conveyance management device 203.

On receiving the conveyance completion signal and automatic guided vehicle ID (SB5), the conveyance management device 203 transmits the conveyance completion signal to the general printing management device 201 (SB6).

Further, the conveyance management device 203 acquires the battery information of the automatic guided vehicle 20 receiving the conveyance completion signal, and determines whether or not a battery remaining capacity is equal to or less than a predetermined lower limit value. As a result, in a case where the battery remaining capacity is equal to or less than the lower limit value, the device transmits, to the automatic guided vehicle 20, charging instruction information for guiding the vehicle to a battery station, and changes the operation status of the conveyance management information to “a charging state”. Further, in a case where the battery remaining capacity is in excess of the lower limit value, the operation status is changed to "a standby state".

On the other hand, the stacker control unit 40 of the stacker 1 receiving the conveyance completion signal from the automatic guided vehicle 20 controls the direct-moving cylinder 62, to return the stacking shelf 22 to a horizontal state. Furthermore, the stacker control unit 40 acquires information in the processing process (e.g., height information of the lifting and lowering table or the like) from the job information already received from the stacker management device 202, and controls the up-down moving motor 46 and the motor 78 for the lifting and lowering table based on the acquired information.

Figure 18:
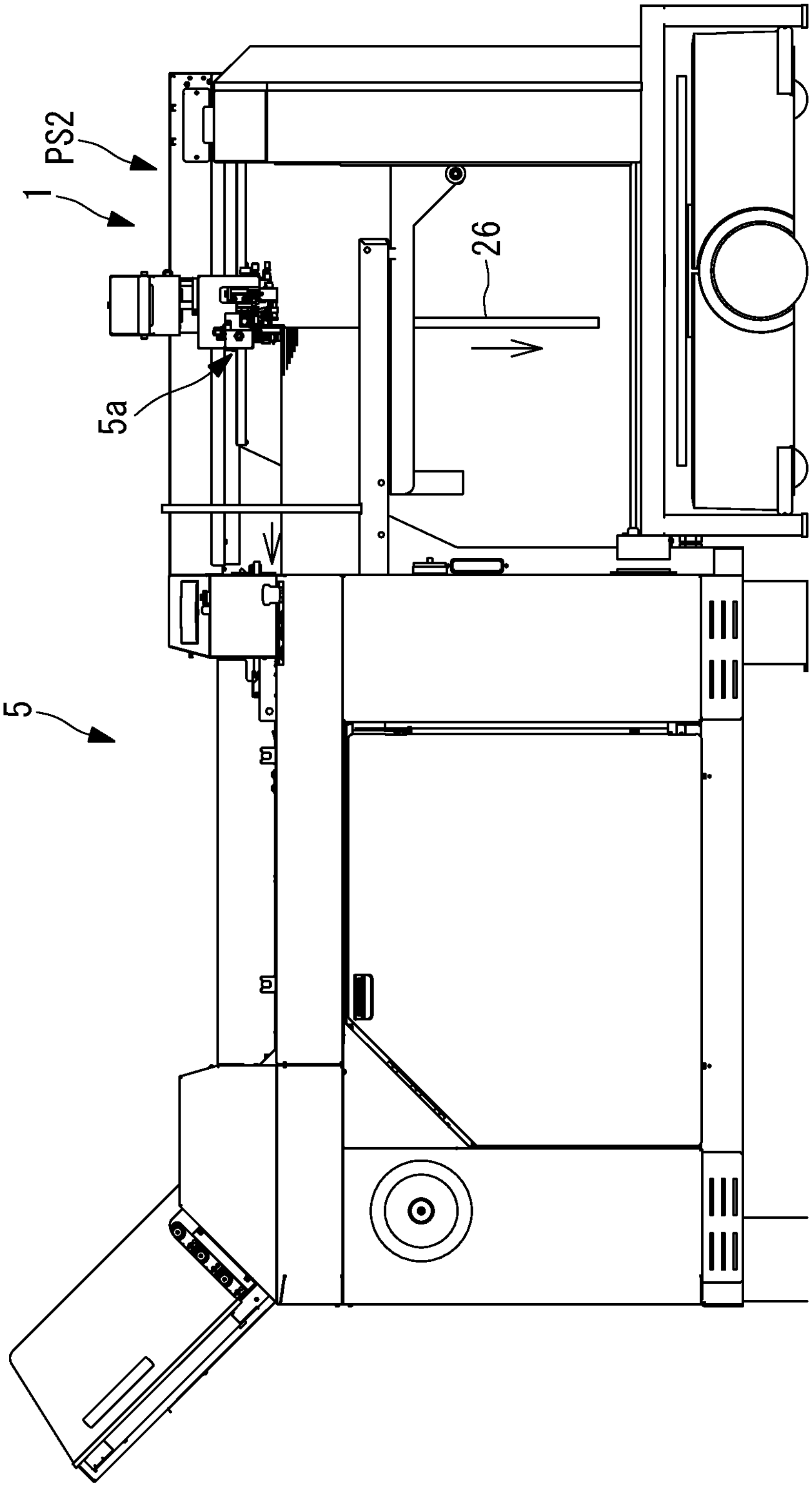
FIG. 18 is a side view showing a state where a stopper of the stacker is lowered at the paper supply position.

Consequently, the motor 78 for the lifting and lowering table is operated, and the stacking shelf 22 is positioned at a height position (second predetermined height) of supplied paper that is individually set depending on the type of paper folding machine 5. Furthermore, the stacker control unit 40 operates the up-down moving motor 46 (see FIG. 6), and displaces the stopper 26 of the stacker 1 downward as shown in FIG. 18. This avoids interference of a paper separator 5*a* of the paper folding machine 5 with the stopper 26.

Also, the battery 94 (see FIG. 4) of the stacker 1 receives power supply from the power supply head 96 disposed in the vicinity of the paper folding machine 5 via the power receiving head 90 as required.

On completing the positioning and obtaining a paper suppliable state to the paper folding machine 5, the stacker control unit 40 transmits a preparation completion signal to the paper folding machine 5. On receiving the preparation completion signal from the stacker 1, the paper folding machine 5 determines whether or not an upper surface of the lifting and lowering table of the stacker 1 is detected by an upper surface detection sensor (not shown) disposed near a paper supply port of the paper folding machine 5.

As a result, in a case where the upper surface is not detected, the paper folding machine 5 transmits an instruction to the stacker 1 to raise the lifting and lowering table. Consequently, the stacker control unit 40 controls the motor 78 for the lifting and lowering table, and raises the lifting and lowering table. This operation is performed until the upper surface of the lifting and lowering table is detected by the upper surface detection sensor. Then, when the upper surface of the lifting and lowering table is detected by the upper surface detection sensor, the paper folding machine 5 determines that the lifting and lowering table of the stacker 1 is disposed at an appropriate position, and starts folding paper based on the job information received from the processing machine management device 205.

Alternatively, the paper folding machine 5 may acquire the stacker ID of the stacker 1, and perform check processing of checking whether or not the acquired stacker ID matches the stacker ID associated with the job ID to be started from now on, before starting the job. Thus, the checking is performed, so that it can be confirmed whether or not the stacker matching the job to be started from now on is disposed at the paper supply position PS2.

Near a paper ejection port of the paper folding machine 5, a sensor that detects ejected paper is disposed. The paper folding machine 5 counts the number of sheets to be processed based on a detection signal from the sensor. The number of the sheets to be processed is transmitted to the stacker 1 directly from the paper folding machine 5 or via the processing machine management device 205 and the stacker management device 202. The stacker control unit 40 controls the motor 78 for the lifting and lowering table depending on a relation between the number of remaining sheets and a height of a paper supply unit of the paper folding machine 5, and moves the lifting and lowering table to an appropriate height position in accordance with proceeding of processing.

Then, on detecting that the count number reaches the number of the sheets to be processed that is prescribed in the job information, the paper folding machine 5 transmits a processing job completion signal to the stacker 1 disposed at the paper supply position PS2 and the processing machine management device 205.

On receiving the processing job completion signal, the stacker control unit 40 of the stacker 1 controls the motor 78 for the lifting and lowering table, and lowers the lifting and lowering table to the position during the moving. Also, the stacker 1 transmits the processing job completion signal and the stacker ID of its own to the stacker management device 202. On receiving the processing job completion signal (SB7), the stacker management device 202 changes the operation status of the received stacker ID to "the standby state" (SB8).

On the other hand, on receiving the processing job completion signal from the paper folding machine 5, the processing machine management device 205 transmits the paper folding machine ID, job ID and processing job completion signal to the general printing management device 201.

On receiving the processing job completion signal and the like (SB9), the general printing management device 201 changes, to "completed", a status of the processing process of the job ID of the job management list, to update the job management list (SB10). Then, the device returns to the step SB1, and is in the standby state until receiving the next printing job completion signal. Also, in a case where the printing job completion signal is already received, the subsequent processing is executed.

As described above, according to the present embodiment, the following operations and effects are exhibited.

The stacking shelf 22 is lifted and lowered to the predetermined height (first predetermined height) corresponding to the printer 3 at the receiving position PS1, and the stacking shelf 22 is lifted and lowered to the predetermined height (second predetermined height) corresponding to the paper folding machine 5 at the paper supply position PS2. Consequently, a manual transshipment work can be omitted and automated. Then, personnel saving can be achieved in a process from the printer 3 to a sheet processing machine even with any combination of a plurality of different types of printers 3 with sheet processing machines such as a plurality of different types of paper folding machines 5.

Since the predetermined height of the stacking shelf 22 is individually set to a set value for each printer 3 and/or each sheet processing machine such as each paper folding machine 5, the stacking shelf 22 can be lifted and lowered to an appropriate predetermined height even for different types of printers 3 or sheet processing machines such as paper folding machines 5.

Since the stacker 1 includes the communication unit 18 that acquires the set value from the superordinate control unit such as the general printing management device 201 or the stacker management device 202, the stacker 1 is flexibly compatible with different types of printers 3 or sheet processing machines such as paper folding machines 5.

Since the stacker 1 includes the unique stacker ID 13, the stacker can be distinguished from the other stacker 1. Consequently, a sheet conveying system in which a plurality of stackers 1 are simultaneously used can be achieved.

Since the stacking shelf 22 is inclined so that the front is disposed above the rear during the running of the stacker 1, it is possible to avoid concern that the paper S stacked on the stacking shelf 22 scatters to fall from the open side on which the stopper 26 and the respective paper width guides 28 are not provided.

The stacker 1 stops and performs work at the receiving position PS1 and the paper supply position PS2. At this time, the power receiving head 90 receives power supply from outside to charge the battery 94. Consequently, the charging can be performed at an appropriate timing.

<Modification 1>

Figure 19:
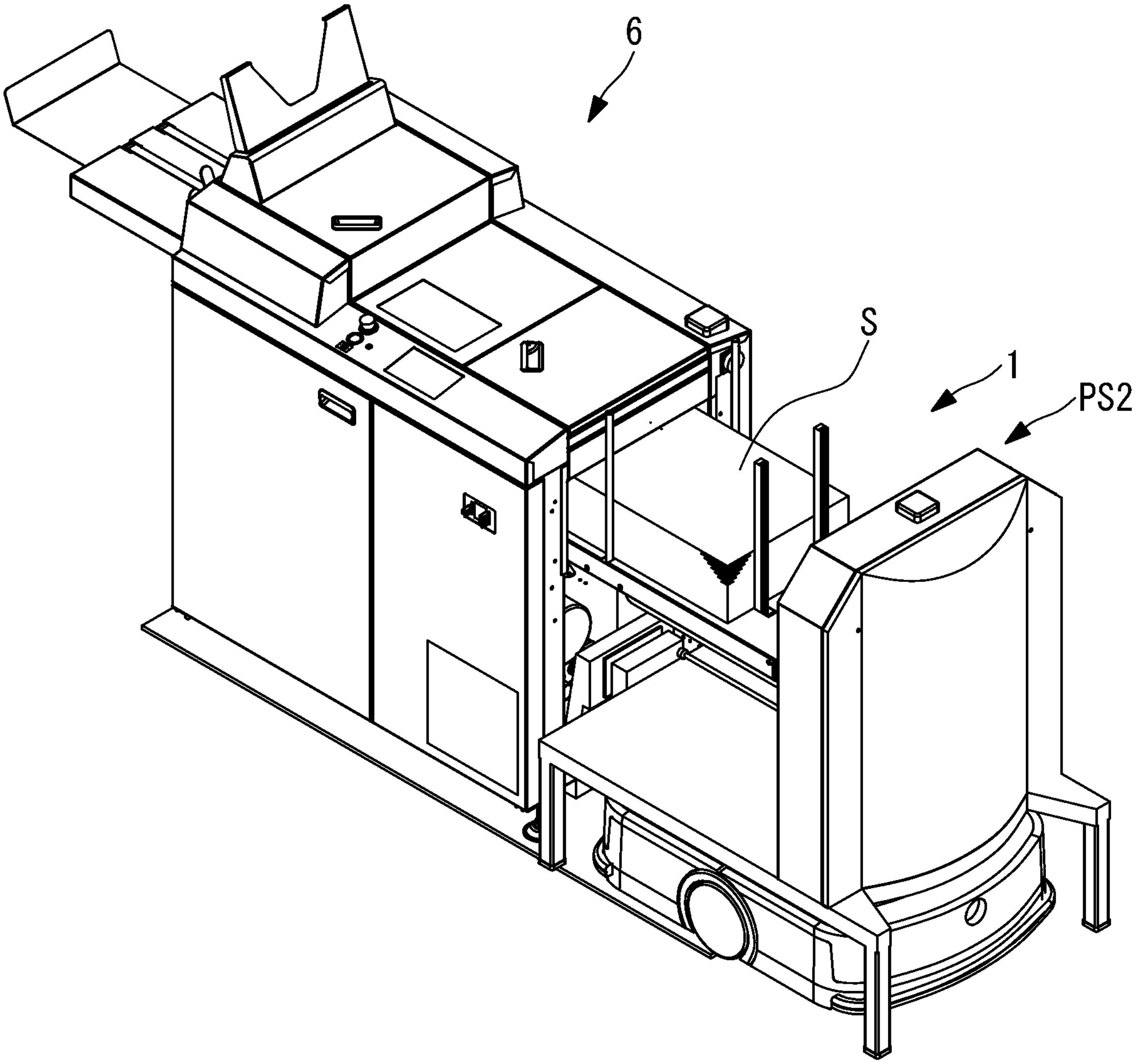
FIG. 19 is a perspective view showing a state where a stacker is disposed at a paper supply position to a creasing machine according to Modification 1.

In the aforementioned embodiment, the paper folding machine 5 is illustrated and described as the processing machine to which paper is supplied from the stacker 1, but the present disclosure is not limited to this example. For example, as shown in FIG. 19, the present disclosure can be applied also to the creasing machine 6 as the processing machine. That is, in a case where the creasing machine 6 is registered as a post-process of the printer 3 in the job information, processing similar to the aforementioned processing is performed, so that paper can be stably supplied also to the creasing machine 6.

Also, in the case of the creasing machine 6, for example, the stacker control unit 40 of the stacker 1 may control the motor 78 for the lifting and lowering table depending on a relation between the number of sheets of paper S to be stacked and a height of a paper supply unit of the creasing machine 6, to adjust the lifting and lowering table to an appropriate height position depending on proceeding of processing.

<Modification 2>

Figure 20:
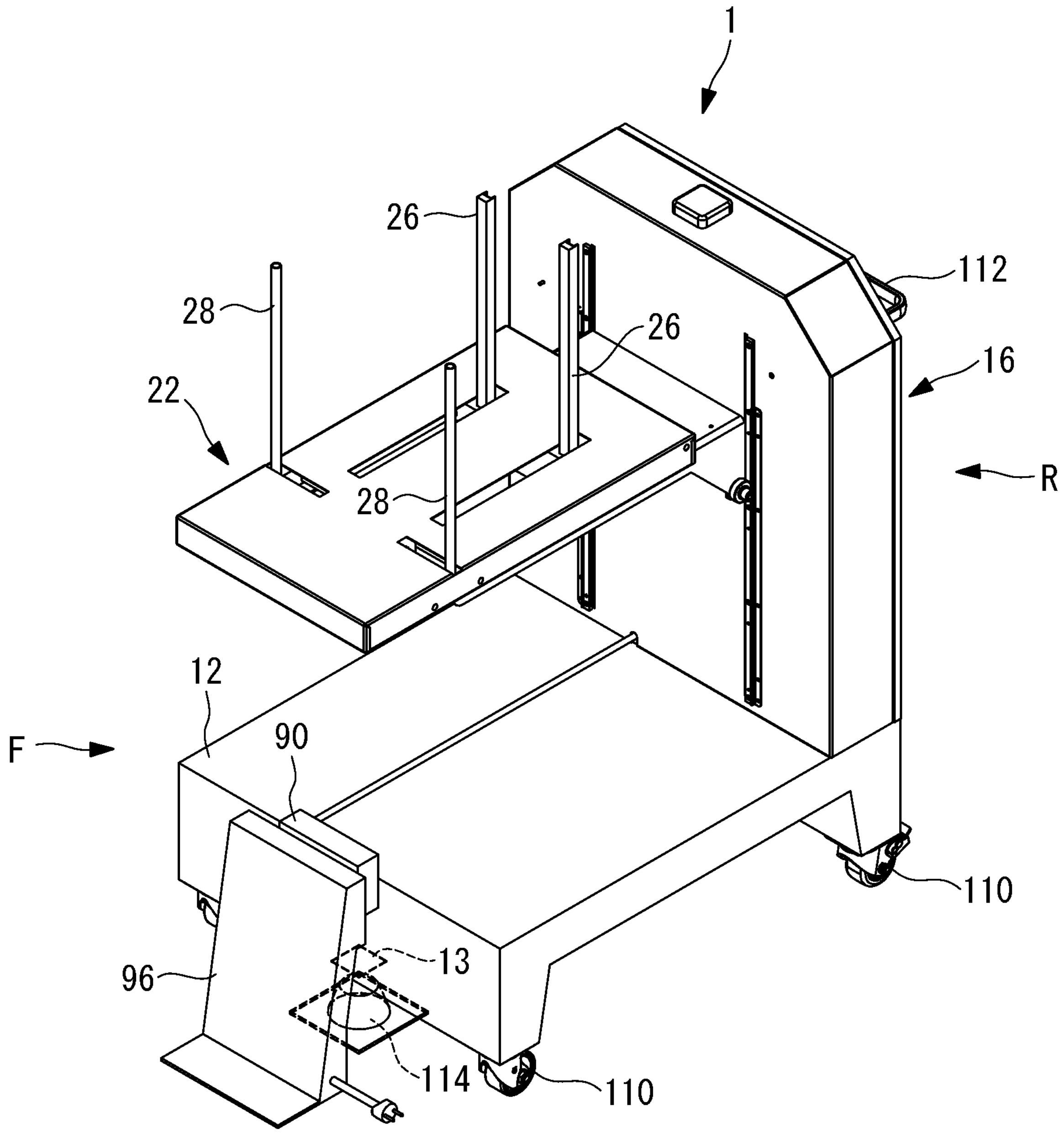
FIG. 20 is a perspective view showing a stacker according to Modification 2.
Figure 21:
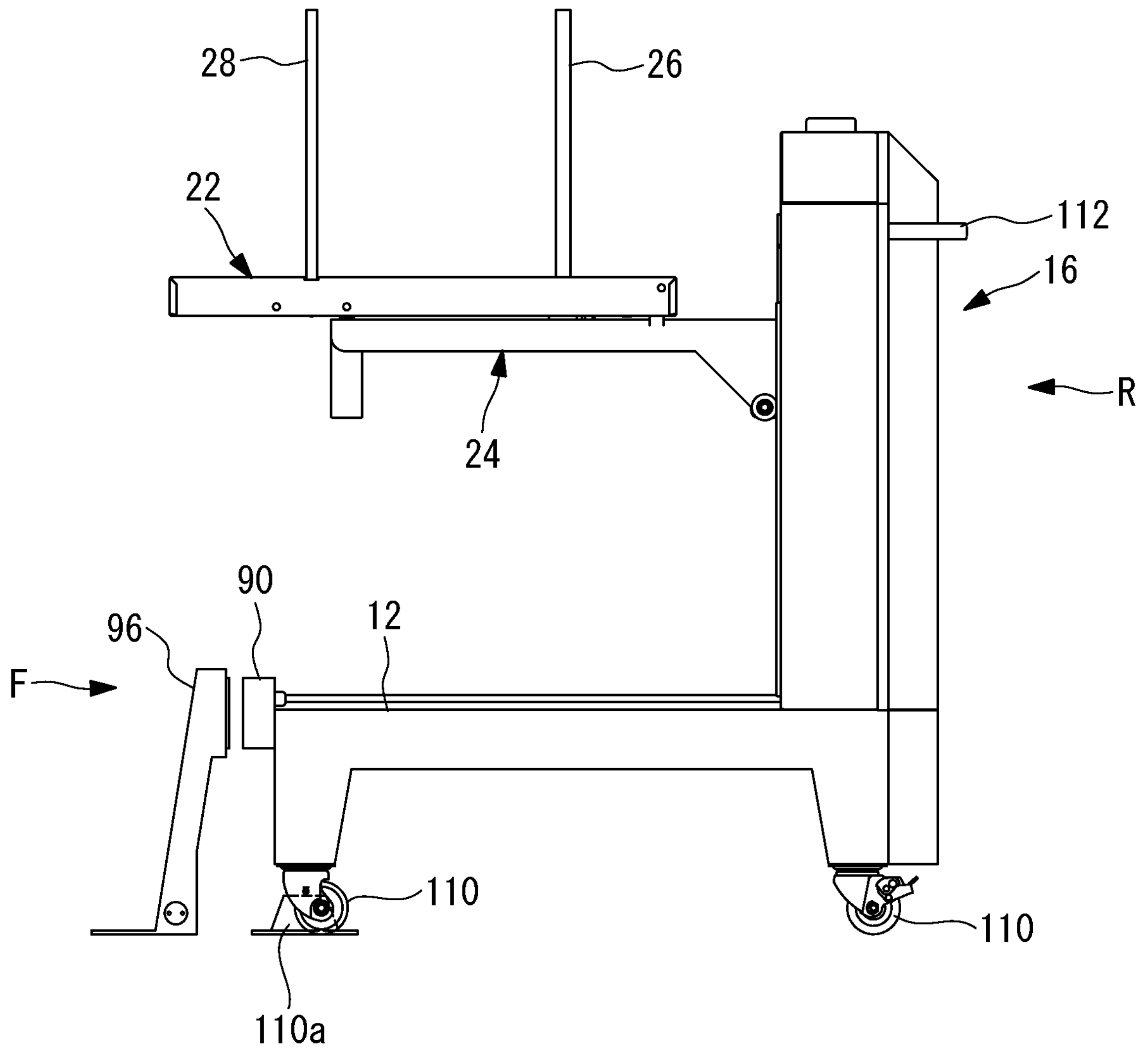
FIG. 21 is a side view of the stacker of FIG. 20.

In the aforementioned embodiment, the stacker 1 is moved by the automatic guided vehicle 20, but the present disclosure is not limited to this example. For example, as shown in FIG. 20 and FIG. 21, each of leg parts 14 of some of stackers 1 may include a caster 110 so that the stacker 1 can run without using the automatic guided vehicle 20. In this case, a handle 112 is disposed on an upper part of a back surface of the main body 16, and a worker conveys the stacker 1. The stacker 1 is positioned by a stopper 110*a* for the caster (see FIG. 21) attached to the caster 110 at a fixed position such as the receiving position PS1 or the paper supply position PS2.

In this case, the stacker ID 13 is disposed on a lower surface of the base 12 on the front F side, and an ID reader 114 is installed in the vicinity of the printer 3 or the processing machine such as the paper folding machine 5. Data received by the ID reader 114 is transmitted to a control unit of the printer 3 or the processing machine, such as the paper folding machine 5.

Note that the stacker 1 may include a running device such as a running motor, and run by itself.

Note that a tilt angle of the stacking shelf 22 during the running of the stacker 1 may be changed depending on a stacking amount of the paper S. For example, the tilt angle when the stacking amount is small may be larger than the tilt angle when the stacking amount is large.

The tilt angle of the stacking shelf 22 may be changed depending on a magnitude of acceleration (including deceleration that is negative acceleration) during the running of the stacker 1. For example, the tilt angle when the acceleration of the stacker 1 is large may be larger than the tilt angle when the acceleration is small.

In the aforementioned embodiment and the modifications, paper has been described as an example of a medium to be conveyed by the stacker 1, but the present invention is not limited to this example. For example, the present invention may be applied to a sheet-shaped medium such as a resin film.

A rotating mechanism that rotates the stacking shelf 22 about a vertical axis may be disposed, and the stacking shelf 22 may be rotated about the vertical axis by the stacker control unit 40. For example, the rotating mechanism is disposed between the stacking shelf 22 and the lifting and lowering table 24, and includes a rotary shaft that rotatably supports the stacking shelf 22 around the vertical axis to the lifting and lowering table 24, a rotating motor that rotates the stacking shelf 22 about the rotary shaft, and the like.

Since the rotating mechanism is included, the paper S is received from the printer 3, and the stacking shelf 22 is then rotated by 90° to access a sheet processing machine such as the paper folding machine 5. The paper S can be supplied in a rotated state by 90° from a received state.

In place of the rotating mechanism that rotates the stacking shelf 22, the automatic guided vehicle 20 may be used to rotate the whole stacker 1 and change orientation of the paper S.

In the aforementioned embodiment, communication is performed between the general printing management device 201 and each of the management devices 202 to 205, but the functions of the management devices 202 to 205 may be included in the general printing management device 201. Also, the communication between the automatic guided vehicle 20 and the general printing management device 201 is performed via the conveyance management device 203, but the automatic guided vehicle 20 and the general printing management device 201 may directly transmit and receive information without passing through the conveyance management device 203. This also applies to the other management device. For example, the stacker 1, the printer 3, various processing machines and the general printing management device 201 may directly transmit and receive information.

Furthermore, one of the management devices may include the function of the other management device. For example, the processing machine management device 205 may include the functions of the stacker management device 202 and the conveyance management device 203.

What is claimed is:

1. A sheet conveying system comprising:

a printer;

a sheet stacking apparatus configured to receive printed sheets from the printer at a receiving position and to stack the printed sheets;

a plurality of sheet processing machines to which the printed sheets are supplied from the sheet stacking apparatus at a supply position being different from the receiving position;

a vehicle configured to convey the sheet stacking apparatus from the receiving position to the supply position;

a management device configured to manage the printer, the sheet stacking apparatus, the plurality of sheet processing machines, and the vehicle, wherein the management device is configured to generate conveyance instruction information for conveying the sheet stacking apparatus from the receiving position to the supply position of any one of the plurality of sheet processing machines based on job information including a manufacturing process procedure for manufacturing a printed product, the vehicle is configured to convey the sheet stacking apparatus from the receiving position to the supply position of any one of the plurality of sheet processing machines based on the conveyance instruction information, the sheet stacking apparatus comprises:

a shelf unit in which a printed sheet from a printer is received and stacked, a lifting and lowering mechanism that lifts and lowers the shelf unit, and a control unit that controls the lifting and lowering mechanism, the control unit controlling the lifting and lowering mechanism to lift and lower the shelf unit to a first predetermined height corresponding to the printer at the receiving position, and to lift and lower the shelf unit to a second predetermined height corresponding to a sheet processing machine at the supply position, the first predetermined height being acquired from the job information and being individually set depending on a type of the printer, the second predetermined height being acquired from the job information and being individually set depending on a type of the sheet processing machine.

2. The sheet conveying system according to claim 1, further comprising:

a communication unit that communicates with a superordinate control unit that is superordinate to the control unit, wherein the communication unit acquires the sot value job information from the superordinate control unit.

3. The sheet conveying system according to claim 1, further comprising:

a power receiving device that receives power at the receiving position and/or the supply position, and a battery that stores the power supplied from the power receiving device.

4. The sheet conveying system according to claim 1, wherein the sheet stacking apparatus includes a caster that runs on a floor.

5. The sheet conveying system according to claim 1, further comprising:

a rotating mechanism that rotates the shelf unit about a vertical axis.

6. The sheet conveying system according to claim 1, wherein the job information includes identification information for identifying the sheet processing machine for use in the manufacturing process procedure and height information of the shelf unit corresponding to the sheet processing machine.

7. A control method of a sheet conveying system, the sheet conveying system includes a printer;

a sheet stacking apparatus configured to receive printed sheets from the printer at a receiving position and to stack the printed sheets;

a plurality of sheet processing machines to which the printed sheets are supplied from the sheet stacking apparatus at a supply position being different from the receiving position; and a vehicle configured to convey the sheet stacking apparatus from the receiving position to the supply position, the sheet stacking apparatus comprising:

a shelf unit in which a printed sheet from a printer is received and stacked, and a lifting and lowering mechanism that lifts and lowers the shelf unit, the control method comprising:

generating conveyance instruction information for conveying the sheet stacking apparatus from the receiving position to the supply position of any one of the plurality of sheet processing machines based on job information including a manufacturing process procedure for manufacturing a printed product, conveying the sheet stacking apparatus from the receiving position to the supply position of any one of the plurality of sheet processing machines based on the conveyance instruction information, controlling the lifting and lowering mechanism to lift and lower the shelf unit to a first predetermined height corresponding to the printer at the receiving position, and to lift and lower the shelf unit to a second predetermined height corresponding to a sheet processing machine at the supply position, the first predetermined height being acquired from the job information and being individually set depending on a type of the printer, the second predetermined height being acquired from the job information and being individually set depending on a type of the sheet processing machine.

8. The control method of the sheet conveying system according to claim 7, wherein the job information includes identification information for identifying the sheet processing machine for use in the manufacturing process procedure and height information of the shelf unit corresponding to the sheet processing machine.

* * * * *